United States Patent
Gil et al.

(10) Patent No.: US 10,803,183 B2
(45) Date of Patent: *Oct. 13, 2020

(54) SYSTEM, METHOD, AND COMPUTER PROGRAM PRODUCT FOR DETECTING AND ASSESSING SECURITY RISKS IN A NETWORK

(71) Applicant: Exabeam, Inc., Foster City, CA (US)

(72) Inventors: Sylvain Gil, San Francisco, CA (US); Domingo Mihovilovic, Menlo Park, CA (US); Nir Polak, Palo Alto, CA (US); Magnus Stensmo, Foster City, CA (US); Sing Yip, San Francisco, CA (US)

(73) Assignee: Exabeam, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,010

(22) Filed: Oct. 18, 2019

(65) Prior Publication Data

US 2020/0082098 A1 Mar. 12, 2020

Related U.S. Application Data

(63) Continuation of application No. 16/150,604, filed on Oct. 3, 2018, now Pat. No. 10,474,828, which is a (Continued)

(51) Int. Cl.
*G06F 21/57* (2013.01)
*H04L 29/06* (2006.01)

(52) U.S. Cl.
CPC ........ *G06F 21/577* (2013.01); *H04L 63/1416* (2013.01); *H04L 63/1433* (2013.01)

(58) Field of Classification Search
CPC   G06F 21/577; H04L 63/1416; H04L 63/1433
(Continued)

(56) References Cited

U.S. PATENT DOCUMENTS 5,941,947 A * 8/1999 Brown ................ G06F 21/6218
  709/225
6,223,985 B1   5/2001 DeLude
(Continued)

OTHER PUBLICATIONS

Ioannidis, Yannis, "The History of Histograms (abridged)", Proceedings of the 29th VLDB Conference (2003), pp. 1-12.
(Continued)

*Primary Examiner* — Dant B Shaifer Harriman
(74) *Attorney, Agent, or Firm* — Lessani Law Group, PC

(57) ABSTRACT

The present disclosure is directed to a system, method, and computer program for detecting and assessing security risks in an enterprise's computer network. A behavior model is built for a user in the network based on the user's interactions with the network, wherein a behavior model for a user indicates client device(s), server(s), and resources used by the user. The user's behavior during a period of time is compared to the user's behavior model. A risk assessment is calculated for the period of time based at least in part on the comparison between the user's behavior and the user's behavior model, wherein any one of certain anomalies between the user's behavior and the user's behavior model increase the risk assessment.

25 Claims, 20 Drawing Sheets

Related U.S. Application Data continuation of application No. 15/709,113, filed on Sep. 19, 2017, now Pat. No. 10,095,871, which is a continuation of application No. 14/507,585, filed on Oct. 6, 2014, now Pat. No. 9,798,883.

(58) Field of Classification Search
USPC .......................................................... 726/22
See application file for complete search history.

(56) References Cited

U.S. PATENT DOCUMENTS

| | | |
|---|---|---|
| 6,594,481 B1 | 7/2003 | Johnson et al. |
| 7,668,776 B1 | 2/2010 | Ahles |
| 8,326,788 B2 | 12/2012 | Allen et al. |
| 8,443,443 B2 | 5/2013 | Nordstrom et al. |
| 8,479,302 B1 | 7/2013 | Lin |
| 8,539,088 B2 | 9/2013 | Zheng |
| 8,606,913 B2 | 12/2013 | Lin |
| 8,676,273 B1 | 3/2014 | Fujisake |
| 8,881,289 B2 | 11/2014 | Basavapatna et al. |
| 9,055,093 B2 | 6/2015 | Borders |
| 9,081,958 B2 | 7/2015 | Ramzan et al. |
| 9,189,623 B1 | 11/2015 | Lin et al. |
| 9,680,938 B1 | 6/2017 | Gil et al. |
| 9,692,765 B2 | 6/2017 | Choi et al. |
| 9,760,240 B2 | 9/2017 | Maheshwari et al. |
| 9,779,253 B2 | 10/2017 | Mahaffey et al. |
| 9,843,596 B1 | 12/2017 | Averbuch et al. |
| 9,898,604 B2 | 2/2018 | Fang et al. |
| 2002/0107926 A1 | 8/2002 | Lee |
| 2003/0147512 A1 | 8/2003 | Abburi |
| 2004/0073569 A1 | 4/2004 | Knott et al. |
| 2006/0090198 A1 | 4/2006 | Aaron |
| 2007/0156771 A1 | 7/2007 | Hurley et al. |
| 2007/0282778 A1 | 12/2007 | Chan et al. |
| 2008/0040802 A1 | 2/2008 | Pierson et al. |
| 2008/0170690 A1 | 7/2008 | Tysowski |
| 2008/0301780 A1 | 12/2008 | Ellison et al. |
| 2009/0144095 A1 | 6/2009 | Shahi et al. |
| 2009/0293121 A1 | 11/2009 | Bigus et al. |
| 2010/0125911 A1 | 5/2010 | Bhaskaran |
| 2010/0269175 A1 | 10/2010 | Stolfo et al. |
| 2012/0278021 A1 | 11/2012 | Lin et al. |
| 2012/0316835 A1 | 12/2012 | Maeda et al. |
| 2012/0316981 A1 | 12/2012 | Hoover et al. |
| 2013/0080631 A1 | 3/2013 | Lin |
| 2013/0117554 A1 | 5/2013 | Ylonen |
| 2013/0197998 A1 | 8/2013 | Buhrmann et al. |
| 2013/0227643 A1 | 8/2013 | Mccoog et al. |
| 2013/0305357 A1 | 11/2013 | Ayyagari et al. |
| 2013/0340028 A1 | 12/2013 | Rajagopal et al. |
| 2014/0315519 A1 | 10/2014 | Nielsen |
| 2015/0046969 A1 | 2/2015 | Abuelsaad et al. |
| 2015/0121503 A1 | 4/2015 | Xiong |
| 2015/0339477 A1 | 11/2015 | Abrams et al. |
| 2015/0341379 A1 | 11/2015 | Lefebvre et al. |
| 2016/0005044 A1 | 1/2016 | Moss et al. |
| 2016/0021117 A1 | 1/2016 | Harmon et al. |
| 2017/0161451 A1 | 6/2017 | Weinstein et al. |
| 2017/0236081 A1 | 8/2017 | Grady Smith et al. |
| 2017/0318034 A1 | 11/2017 | Holland et al. |
| 2018/0234443 A1 | 8/2018 | Wolkov et al. |
| 2018/0248895 A1* | 8/2018 | Watson .................... G06N 3/08 |
| 2018/0288063 A1* | 10/2018 | Koottayi ................. G06F 15/76 |
| 2019/0034641 A1 | 1/2019 | Gil et al. |
| 2020/0021607 A1* | 1/2020 | Muddu ............... G06F 3/04847 |
| 2020/0021620 A1* | 1/2020 | Puratheppparambil ........................ H04L 63/102 |

OTHER PUBLICATIONS

DatumBox Blog, "Machine Learning Tutorial: The Naïve Bayes Text Classifier", DatumBox Machine Learning Blog and Software Development News, Jan. 2014, pp. 1-11.

Malik, Hassan, et al., "Automatic Training Data Cleaning for Text Classification", 11th IEEE International Conference on Data Mining Workshops, 2011, pp. 442-449.

Wang, Alex Hai, "Don't Follow Me Spam Detection in Twitter", International Conference on Security and Cryptography, 2010, pp. 1-10.

* cited by examiner

| Login Session ID 405 | User Name 410 | Start Time 415 | End Time 420 | Events 425 | Accounts 430 | Assets 435 |
|---|---|---|---|---|---|---|
| | | | | | | |

FIG. 4a

| Object ID 440 | Asset Type 445 | Asset Name 450 | IP Address 455 | First Time Seen 460 | Last Time Seen 465 | Zone 470 | Risk State 475 | Compromised Time 480 | Risk Session 485 |
|---|---|---|---|---|---|---|---|---|---|
| | | | | | | | | | |

FIG. 4b

EXAMPLE OF CALCULATING RISK SCORE

EXAMPLE RULES

| Rule Description 1210 | Points 1220 | Confidence Threshold 1230 | Event Trigger 1240 |
|---|---|---|---|
| New Workstation for user | 30 | 0.8 | Workstation Logon |
| First Server Access for user | 15 | 0.8 | Server Logon |
| Abnormal ISP for user | 20 | 0.8 | VPN Login |
| Abnormal geo-location origin vs. peers (i.e., department) | 30 | N/A | VPN Login |
| Abnormal geo-location origin vs. organization | 20 | N/A | VPN Login |
| Abnormal time of day | 5 | 0.8 | Workstation Logon |
| Abnormal duration for session | 5 | 0.8 | Workstation Logout |
| Abnormal number of servers accessed for user | 30 | 0.8 | Workstation Logout |
| Abnormal number of servers accessed for peers | 30 | 0.8 | Workstation Logout |
| Abnormal number of accessed resources for users | 30 | 0.8 | Workstation Logout |
| Abnormal number of accessed resources for peer | 30 | 0.8 | Workstation Logout |
| First connection from country | 40 | N/A | VPN Login |
| First connection from region | 20 | N/A | VPN Login |
| First connection from src_host | 40 | N/A | VPN Login |
| Abnormal log to network zone for user | 15 | ? | Kerberos Logon |
| Abnormal log to network zone for peer | 15 | ? | Kerberos Logon |
| High-privilege user | 20 | N/A | Workstation Logon |
| Sensitive data or server | 30 | N/A | Kerberos Logon |
| SRC_ip is malicious | 60 | N/A | VPN Login |
| SRC_ip is blacklisted | 100 | N/A | VPN Login |
| Abnormal number of accessed zones for peers | 30 | 0.8 | Workstation Logout |
| Abnormal number of accessed zones for user | 30 | 0.8 | Workstation Logout |

FIG. 12

EXAMPLE OF CALCULATING RISK TRANSFER SCORE

EXAMPLE OF USER INTERFACE

SYSTEM, METHOD, AND COMPUTER PROGRAM PRODUCT FOR DETECTING AND ASSESSING SECURITY RISKS IN A NETWORK

RELATED APPLICATIONS

This application is a continuation of U.S. patent application Ser. No. 16/150,604 titled "System, Method, and Computer Program Product for Detecting and Assessing Security Risks in a Network," which was filed on Oct. 3, 2018, which is a continuation of U.S. patent application Ser. No. 15/709,113 titled "System, Method, and Computer Program Product for Detecting and Assessing Security Risks in a Network," which was filed on Sep. 19, 2017, now U.S. Pat. No. 10,095,871, and which is a continuation of U.S. patent application Ser. No. 14/507,585 titled "System, Method, and Computer Program Product for Detecting and Assessing Security Risks in a Network," which was filed on Oct. 6, 2014, now U.S. Pat. No. 9,798,883. The contents of the foregoing patent applications are incorporated by reference as if fully disclosed herein.

BACKGROUND OF THE INVENTION

1. Field of the Invention

This invention relates generally to network security risks and, more particularly, to a system and method for detecting security risks in a network using behavior models.

2. Description of the Background Art

Computer networks of companies, government agencies, institutions, and other entities are frequently under attack from hackers. Known systems require administrators to build queries against an IT database in order to determine security risks. For example, an administrator may run a query for user accounts in which a user tried to log in five times and failed. This approach requires the administrator to know the behavior patterns of attackers and predefine what is considered a risk.

A problem with this approach is that attackers' patterns vary and change, and, therefore, it is not always possible to know in advance what malicious behavior looks like. Also, attackers often impersonate a registered user in the network. Therefore, there is a need for a solution that can detect security risks for unknown attack patterns and that can detect attackers impersonating legitimate users of a network.

SUMMARY OF THE DISCLOSURE

The present disclosure is directed to a system, method, and computer program for detecting and assessing security risks in an enterprise's computer network. In one embodiment, a computer system builds behavior models for users in the network (one for each user) based on the users' interactions with the network, wherein a behavior model for a user indicates client device(s), server(s), and resources (e.g., applications, data) used by the user. For each user that logs onto the network, the system compares a plurality of user events during a period of time (e.g., a logon session or a 12 or 24 hour day) to the user's behavior model, including comparing a client device used, server(s) accessed, and any resources accessed to the user's behavior model. The system calculates a risk assessment for the plurality of user events based at least in part on the comparison between the user events and the user's behavior model, wherein any one of certain anomalies between the user events and the user's behavior model increase the risk assessment.

In certain embodiments, the period of time is a user logon session (also referred to as a login session) in the network and the risk assessment is calculated for the user logon session, and wherein a user logon session begins at a user's log on to the network and ends at the subsequent log out of the network or a specified period of inactivity.

In certain embodiments, the user events are identified from raw data logs, wherein enhanced events logs are created from the raw data logs by adding additional context information related to the user events, wherein the enhanced event logs are grouped by user logon session to track user actions during a user logon session, and wherein the enhanced event logs are used to build user behavior models.

In certain embodiments, the additional context information comprises one or more of the following: additional user information, additional client device information, additional server information, and additional information about accessed data.

In certain embodiments, the user's behavior model includes the user's time logon patterns and comparing the plurality of user events to the user's behavior model also includes determining whether the user events are occurring or occurred at a time consistent with the time patterns in the user's behavior model.

In certain embodiments, the user's behavior model include the user's geo-location logon patterns and comparing the plurality of user events to the user's behavior model also includes determining whether a geo-location from which the user logged in is consistent with the geo-location patterns in the user's behavior model.

In certain embodiments, calculating the risk assessment comprises associating a sub-total risk score with each of certain anomalies in the user events and aggregating all sub-total risk scores to calculate the risk assessment for the plurality of user events.

In certain embodiments, the system stores rules that define types of anomalies associate with a positive risk score and calculating a risk score for each of the user events comprises determining whether the user event satisfies one of the rules. There may also be rules associated with a negative risk score.

In certain embodiments, one or more of the following are factored into the risk assessment: the user's access authorization level in the system, a value of the data accessed, and threat intelligence.

BRIEF DESCRIPTION OF THE DRAWINGS

FIG. 4*a* is an example of the fields in a session database.

FIG. 4*b* is an example of fields in an asset database.

FIG. 12 is a table of example rules.

DETAILED DESCRIPTION OF THE PREFERRED EMBODIMENTS

Figure 1:
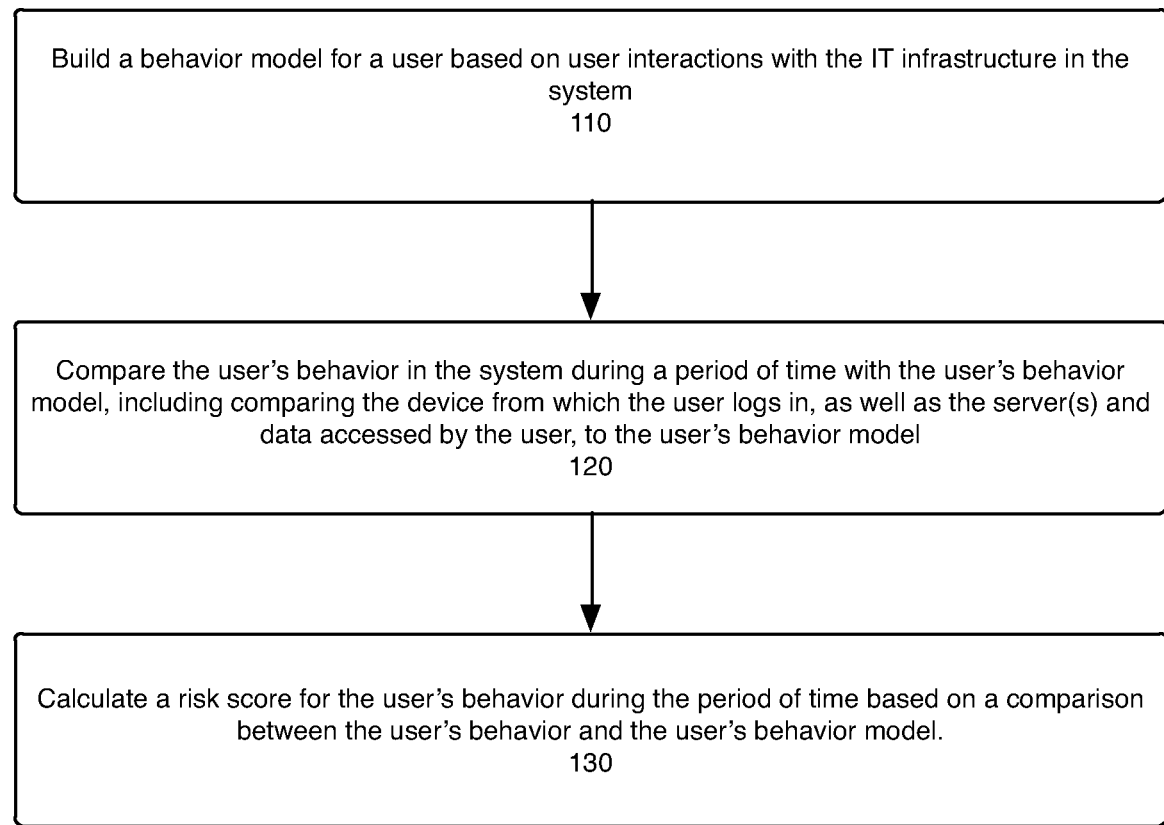
FIG. 1 is a flowchart that illustrates a method for detecting and assessing security risk in an enterprise's computer network.

FIG. 1 illustrates a method, performed by a computer system, for detecting and assessing security risks in an enterprise's computer network/system according to one embodiment of the invention. The system builds a behavior model for authorized users in an enterprise's computer network (step 110). An enterprise may be a company, institution, government agency, or other entity with multiple users. The behavior model is a data model that reflects the user's behavior with respect to the IT infrastructure in the network, such as the client device(s) used to access the network, VPNs used to access the network, the server(s) accessed in the network, applications used in the network, data accessed in the network, time/day logon patterns, and geo-location logon patterns. The data in a behavior model indicates a user's "normal" behavior in that it indicates the devices, applications, data, and patterns most often used, accessed, or otherwise associated with the user.

In response to a user accessing the enterprise's network, the system compares the user's current behavior in the network over a period of time to the user's behavior model and determines if there are any anomalies between the user's behavior during the period of time and his/her behavior model (step 120). Specifically, in one embodiment, the system compares data related to a plurality of user events during a period of time, such as network logon, server access, data access, etc., to the behavior model. The period of time may be of defined length or variable length. An example of a defined-length period of time is a 12 or 24-hour day. An example of a variable-length period of time is a user logon session, which begins when a user logs in to the network and ends either at log out or after a certain period of inactivity (e.g., 5 hours of inactivity).

The system calculates a risk score, or otherwise assesses a risk, associated with the user events during the period of time (step 130). The risk score is based at least in part on the comparison between the user events during the period of time and the user's behavior model. As discussed further below, other factors may also be included in the risk score calculation, such as the user's access authorization level in the system, the value associated with data accessed, and threat intelligence information.

In certain embodiments, the system may aggregate data from users that share a common characteristic (e.g., same role or department) and create a group behavior model. In such embodiments, a user's behavior in a session may be compared to both the user's behavior model and the group's behavior model. Also, in certain embodiments, the system may build behavior models for assets, such as devices. The use of an asset in a session may be compared to the behavior model for the asset. For example, a behavior model for a device may track the users who have accessed the device (and how many times), and the system may be configured such that a risk-score-rule triggers when an unexpected user accesses the device. Behavior for other entities can be modeled too and analyzed in accordance with the methods described herein.

Figure 2:
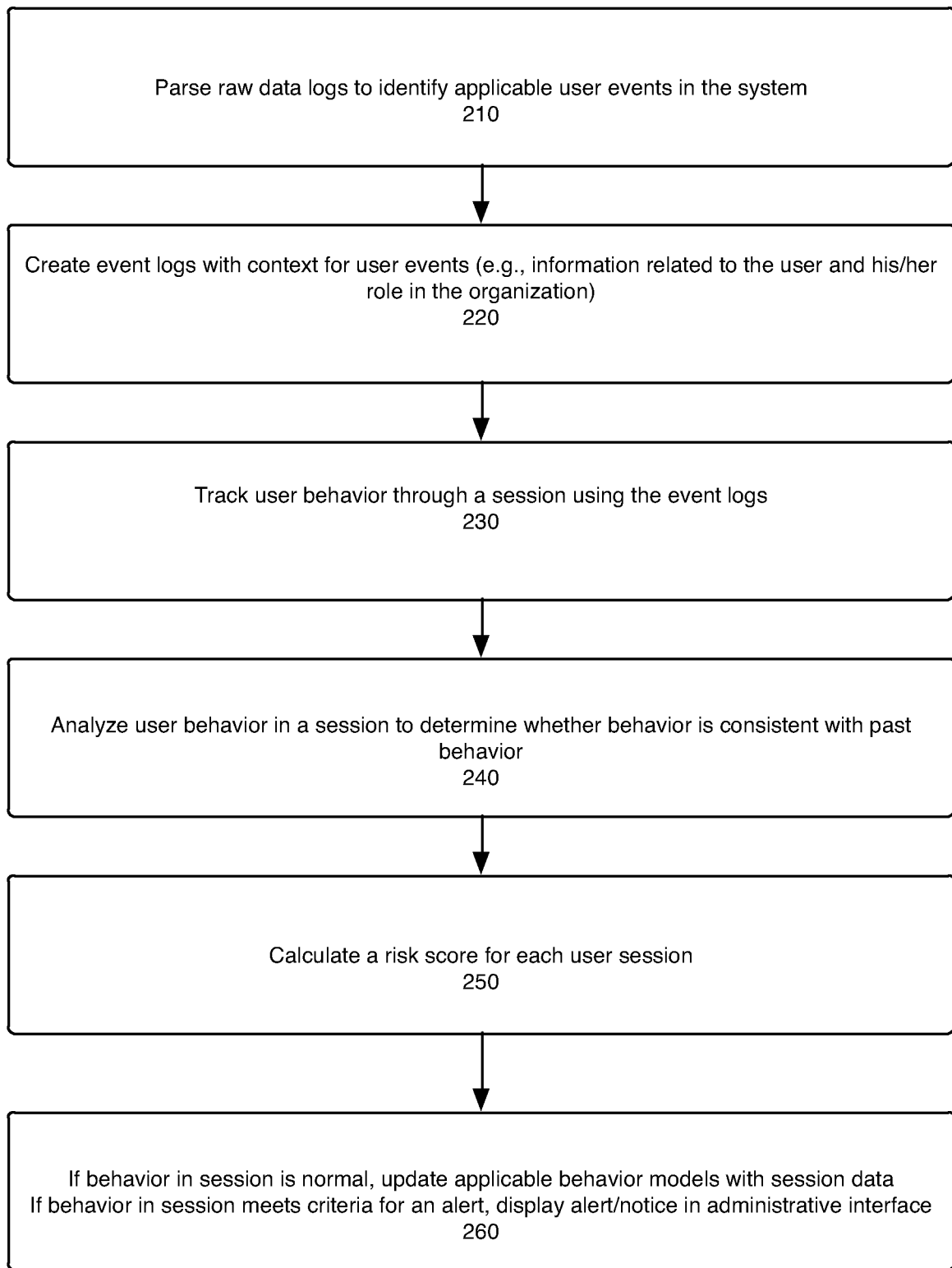
FIG. 2 is a flowchart that illustrates an example implementation of the method of FIG. 1.

FIG. 2 illustrates an example implementation of the above method, once initial behavior models have been created for users in the system. The system parses raw data logs to identify applicable user events in the system (step 210). In one embodiment, after an initial training period in which past data logs (e.g., the past 90 days) are parsed for the purpose of creating the initial behavior models, this is done on an on-going basis as raw data logs are received from one or more log systems. The system then creates enriched event logs with additional data that provides further context for the user events (discussed below) (step 220). The system uses the enriched event logs to track users through a "session," which may be a logon session or a defined period of time (step 230). Each user session is then analyzed to determine whether the user behavior is consistent with past behavior for the user and/or user's peers/department or is considered an anomalous behavior (step 240). A risk score is calculated for each user session based at least in part on the analysis in step 240 (step 250). Other factors that may also influence the risk assessment include the user's access authorization level in the system, the value of the data accessed, and threat intelligence information.

If the behavior in a user session is considered normal (e.g., risk score is low), then the session data is used to update the user's behavior model (and, in some cases, the applicable department/peer/asset behavior model) (step 260). If the behavior is considered abnormal (e.g., risk score exceeds a threshold), an alert or notice is displayed in an administrative interface for the risk assessment system (step 260), and the session data is not used to update the behavior model.

Each of the functions performed in FIG. 2, as well as creating behavior models, is discussed in further detail below.

Log Extraction and Context Enrichment

In one embodiment, the system obtains raw data logs related to a user's interactions with the IT infrastructure, such as user logon events, server access events, application access events, and data access events. The raw data logs may be obtained from third party systems.

The system identifies applicable user events (i.e., those user events used in a risk assessment, such as the aforementioned events) from the raw data logs and creates event logs. An event may span multiple raw data logs, and, therefore, there may be a 1 to n ratio between event logs and raw data logs.

The event logs are then supplemented with additional data that provides further context for the user events. In one embodiment, the context includes the identity of the user (e.g., the full name of the user) and his/her role within the enterprise. For example, if the original event log only includes a user logon ID, the system may enrich the event log with the user's full name, role, and department. Examples of the type of questions context information will enable the risk engine to answer are: "Is the user an administrator?" or "Is the user an executive?" This is important because the risk to the system may depend on who the user is. Abnormal behavior by a user with access to highly-sensitive data may be more of a threat than abnormal behavior by a user with only limited access privileges. Other types of context information added to an event log may include information pertaining to the client and/or server devices involved in the event, such as the location of the devices.

In order to enrich the event logs with additional data, the system may look up information in other data sources, such as Active Directories, human resources databases, threat intelligence databases, and asset databases. For example, the system may access an Active Directory database to determine to identify the full name of a user associated with a user logon and password. Similarly, the system may access an asset database in order to determine a device name and geographical zone associated with an IP address. In one embodiment, the system parses risk rule expressions to see what additional context data is needed in order to evaluate the rule expression. The rules may specify the data required for the rule and the data source(s) from which the information is to be retrieved. Thus, the type of data used for context enrichment need not be hardcoded into the software of the system, but may be obtained from the rules and therefore the system can dynamically change its context enrichment as rules change.

Figure 3:
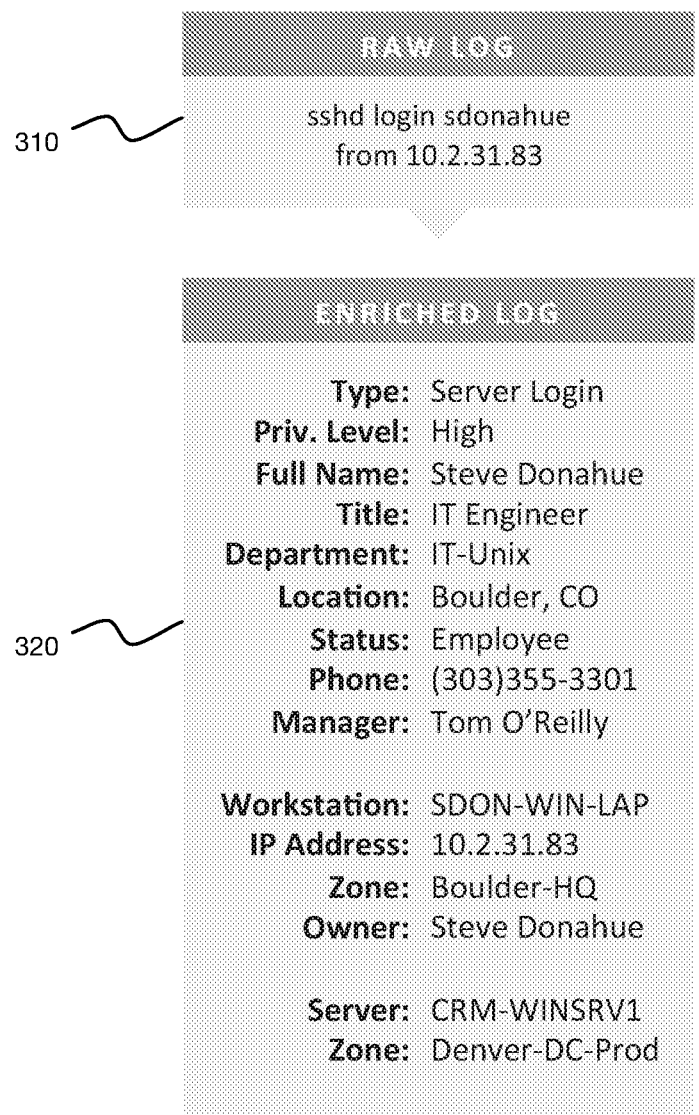
FIG. 3 illustrates an example of an enriched log.

FIG. 3 illustrates an example of an enriched log 320. In this case, the original event log 310 is supplemented with the logon type, privilege level of the user, full name of the user, the user's title, the user's department, the user's normal work location, the user's employment status, the user's phone number, the user's manager, the workstation name from which the user logon, the geographical zone in which the workstation resides, the user to whom the workstation is assigned, the name of the server to which the user logged in, and the geographical zone in which the server resides.

Session Tracking

The enriched event logs are used to track user behavior through a session (fixed length or variable length). The system evaluates the event logs and groups them by session (i.e., maps event logs to sessions). Grouping events by logon session enables the system to determine whether the behavior over the course of an entire logon session is normal, such as whether the duration of the session is normal or the number of servers accessed within a session is normal.

In evaluating an event log, the system determines whether the event belongs to an existing, open session or whether the event is a new logon session. In one embodiment, the system maintains a session database, with an entry for each user logon session. When the system determines that a new logon session has started, it adds an entry to the session database for the session and adds information from the applicable event log to the session entry. If the system determines that an event belongs to an existing session, it will add information from the event log to the existing session.

FIG. 4a illustrates an example of the fields in a session database. The session ID 405 is a unique ID for the session. The start times and end times 415, 420 are the start and ends of the session. The user name 410 is the name of the user associated with the account used for the first logon event for the session. The events 425 are the event logs associated with the logon session, the accounts 430 are the accounts used by the user during the logon session, and the assets 435 are the assets (i.e., devices and, in some cases, resources) accessed during the logon session For purposes of this disclosure, a "user" is a person (e.g., Steve Donahue) and an "account" is an account via which a user (or group of users) can log onto the system (e.g., an account with name "sdonahue" and password "ABC123"). Those skilled in the art will appreciate that the actual database may include additional or other fields.

The data in the session database enables the system to maintain a state for each user in the system. In one embodiment, maintaining a state for a user comprises tracking whether the user is logged into the system and, if so, tracking the user accounts used and assets (e.g., devices, resources (in some embodiments) accessed during the session, including keeping track of which device was last accessed by the user.

During a security attack, the attacker may logon to the system using one identity and switch identities (i.e., switch user accounts), hopping from one device to another. Thus, maintaining a user state throughout a logon session includes tracking a user's movements across a network, including if he/she switches identities in moving from one device to another. Via the session information stored in the session database, the system knows which device a user last accessed and, if it sees a new device-access event originating from the device the user last accessed, it associates the new device-access event with the user, even if different user accounts were used to access the two devices.

Figure 5A:
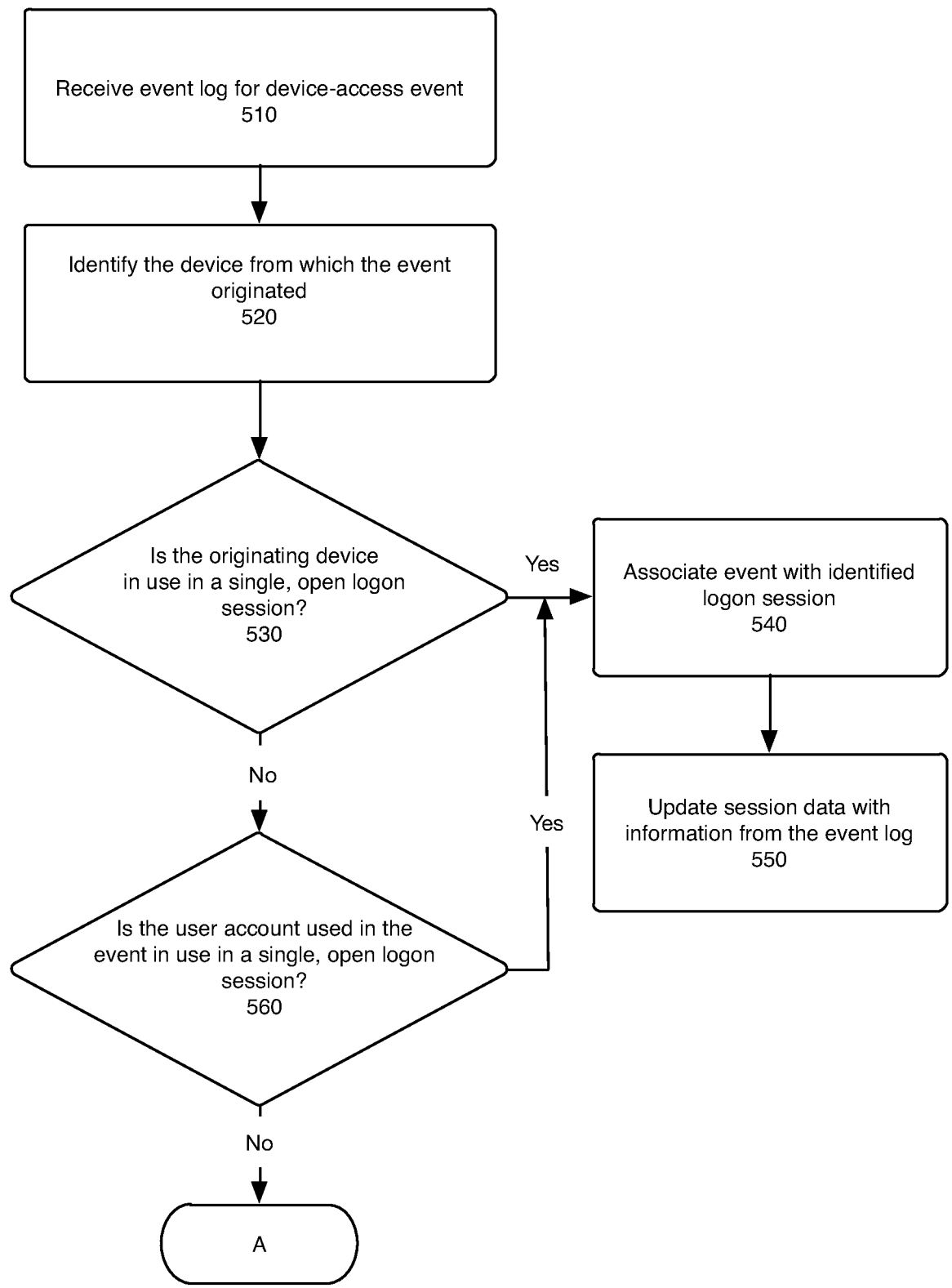
FIGS. 5*a* and 5*b* are flowcharts that illustrate an example method for tracking user movement across a network during a logon session.
Figure 5B:
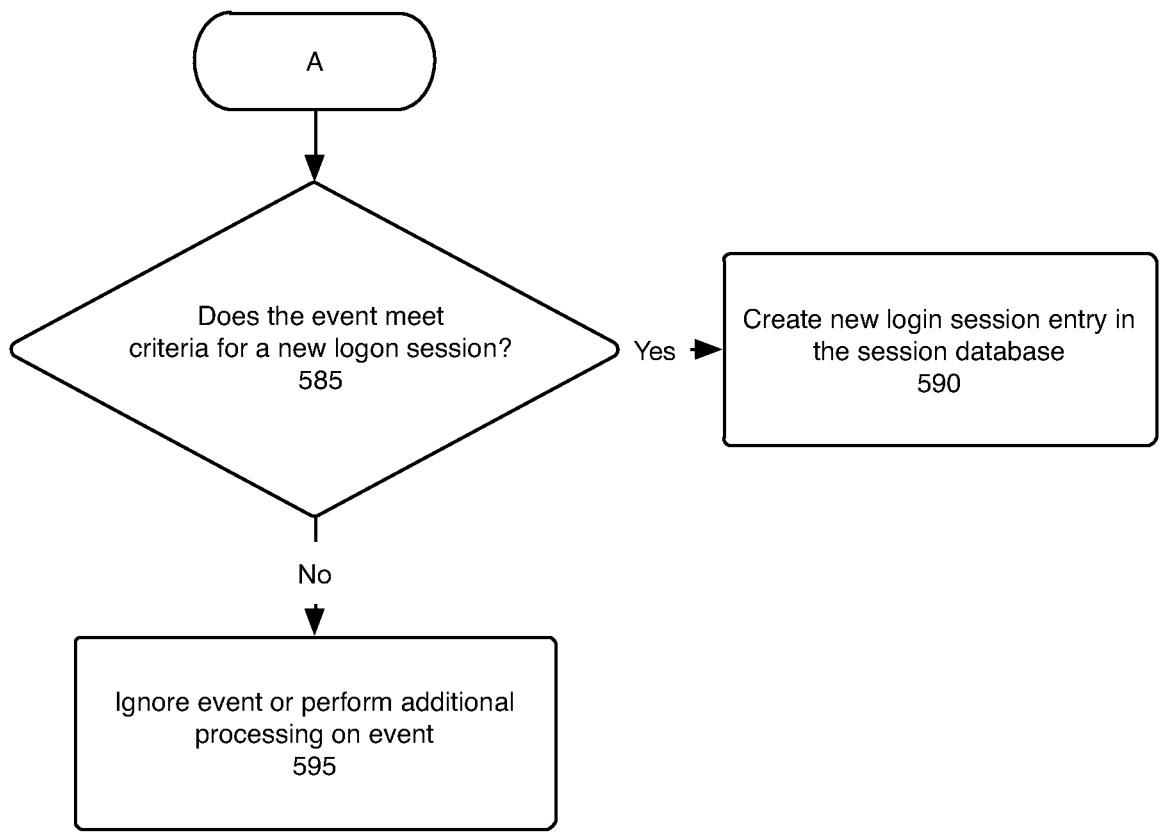

FIG. 5 illustrates an example method for tracking user movements (i.e., sequential device-accesses) across a network during a logon session, as well as tracking user accounts used during a logon session. The system receives an event log for a device-access event (step 510). From the event log, the system identifies the device from which the access event originated (step 520) and searches open sessions (i.e., logon sessions that have not yet ended) in the session database to see if the originating device is in use in a single, open, logon session (step 530). If the originating device is use by an open logon session (and only one open logon session), the system associates the event with the open logon session (step 540), and updates the session data for the session with information from the event, including adding the device and account used (if not already in the session) to the session data (step 550). If not, the system determines if the user account used in the device-access event is in use in an open logon session (step 560). If the user account has been used in an open logon session, the event is associated with that open logon session (step 570), and the session data for the session is updated with information from the event log (step 550). In one embodiment, the determination in step 560 only evaluates to a "yes" if the user account in question was used to logon to the network in another open session (i.e., the account was used in the event that started the logon session). If determination in step 560 evaluates to a "no," the system then determines whether the device-access event meets criteria for a new logon session (i.e., whether the event can be considered the start of a logon session) (step 585). An example, in one embodiment, of an event that satisfies the criteria is if a user who is not logged on anywhere logs onto a computer where nobody else is currently logged on. In response to the event satisfying the criteria, the system creates a new session entry in the session database (step 590). Otherwise, the event is ignored or subject to additional processing.

The way in which devices are identified in raw data logs can vary. For example, some raw data logs may reference device by IP address and others by host name. Therefore, in one embodiment, the system maintains a device or asset database in which IP addresses and host names are mapped to unique device IDs. FIG. 4b illustrates an example of the fields in an asset database, which in this case store the following information for an asset: object ID 440 (a unique identifier for the device/object), asset type 445 (e.g., Windows server, Linux server, etc.), asset name 450, IP address 455, time first seen 460, time last seen 465, geographical zone 470, risk state 475 (e.g., compromised or uncompromised), compromised time 480 (if compromised), and risk session 485 (if compromised, the session ID in which the asset was first compromised). An asset may be marked compromised in the asset database if an administrator designates it as compromised or if information associated with the session (e.g., risk score) meet certain criteria, such as the risk score exceeding a specified threshold. The asset database may also be used to store information for and track the state of other types of assets, such as resources (e.g., applications, files, etc.).

As an example of session tracking, assume the system receives raw data logs indicating the following events in the following order:

Event 1: sdonahue logs onto Workstation 1 with IP Address 111.111.11.111

Event 2: jmiller logs onto Server 2 from IP Address 111.111.11.111

Event 3: jmiller logs onto 111.111.11.113 from 111.111.11.112

The system will then create context-enriched event logs that indicate the following (among other things):

Context-enriched Event 1: Steve Donahue logged onto Workstation 1 with IP address 111.111.11.111 using the "sdonahue" account. This is the start of a logon session for Steve Donahue.
 The system mapped the "sdonahue" account to Steve Donahue using a user account database.
 The system will associate Workstation 1 with IP address 111.111.11.111 in the asset database.

Context-enriched Event 2: John Miller logged onto Server 2 from Workstation 1 using the "jmiller" account.
 The system used the asset database to identify that IP address 111.111.11.111 is Workstation 1.
 The system mapped "jmiller" to John Miller
 For purposes of this example, assume that at the time of Event 2, "sdonahue" is the only user logged onto Workstation 1.

Context-Enriched Event 3: John Miller logged into Sever 3 from Server 2 using the "jmiller" account.
 The system mapped "jmiller" to John Miller
 The system used the asset database to identify that IP address 111.111.11.112 is Server 2 and that IP address 111.111.11.113 is server 3.

Using the method of FIG. 5, the system will associate all three of the above events with the same session and infer the following:

Steve Donahue logged onto Workstation 1 using the "sdonahue" account.

Steve Donahue used the "jmiller" account to log onto Server 2 from Workstation 1.

Steve Donahue used the "jmiller" account to log onto Server 3 from Server 2.

The logon session data for Steve Donahue will indicate that Steve Donahue accessed Workstation 1, Server 2, and Server 3 in that order. It will also indicate that he used both the "sdonahue" and "jmiller" accounts during the session. In this example, the system will not create a new logon session for Jeff Miller in response to receiving Event 2. This is because the system will recognize that the originating computer (Workstation 1) in Event 2 is already in use by Steve Donahue (or a person using Steve Donahue's account). Therefore, the "jmiller" account will be associated with Steve Donahue for this session, even if Steve Donahue has never used that account before and even though the account is normally associated with Jeff Miller. Event 3 will be associated with Steve Donahue because the session database will indicate that he logged onto Server 2 with the "jmiller" account and that the "jmiller" account was used to logon onto Server 3 from Server 2.

Behavior Models

Select session data is recorded in behavior models. In one embodiment, the system has an initial training period with x number of days (e.g., 90 days) in which x days of session data are recorded in behavior models before behavior analysis begins. Subsequently, after a risk assessment has been made for a session, the applicable behavior models are updated with data from the session, provided the risk score for the session does not exceed a threshold.

Figure 6:
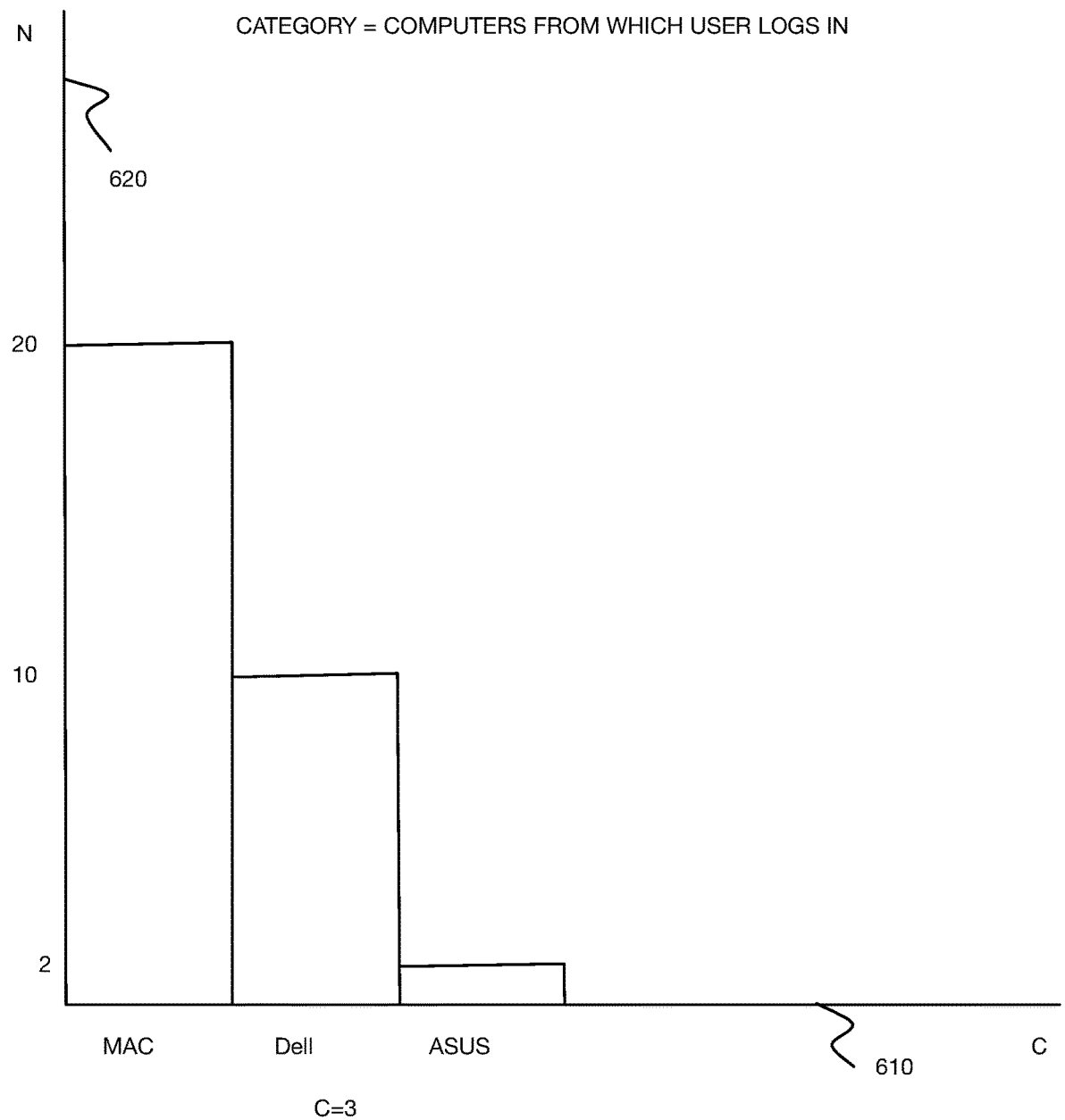
FIG. 6 illustrates an example histogram.

In one embodiment, a behavior model comprises a plurality of histograms, where there is a histogram for each category of data in the behavior model. For example, there may be a histogram for each of the following: client devices from which the user logs in, servers accessed, data accessed, applications accessed, session duration, logon time of day, logon day of week, and geo-location of logon origination. In a histogram, values for a category are along one axis (e.g., the x axis) and the number of times the value is received for the category is along another axis (e.g., the y axis). Each time an event occurs that correspond to a histogram, the system updates the histogram in the applicable user's/group's/asset's behavior model(s), unless the behavior is in a session with a risk score that exceeds a threshold (i.e., the session is considered high risk). FIG. 6 illustrates an example of a categorical histogram in which the values for the categories are strings. In this example, the category is the computer from which the user has logged on in the past.

On the x-axis 610 are the "bins" that represent the string values received for the category (i.e., computer from which the user logged in), and the values on the y-axis 620 are the number of times the value has been received. In the illustrated example, the histogram shows that the user logged in from his MAC twenty times, his DELL ten times, and his ASUS two times. Therefore, if the user logs in with a LENOVO the next time, the system may detect an anomaly. Those skilled in the art will appreciate that devices are identified by a unique ID, but brand names were used in FIG. 6 for simplicity.

Figure 10A:
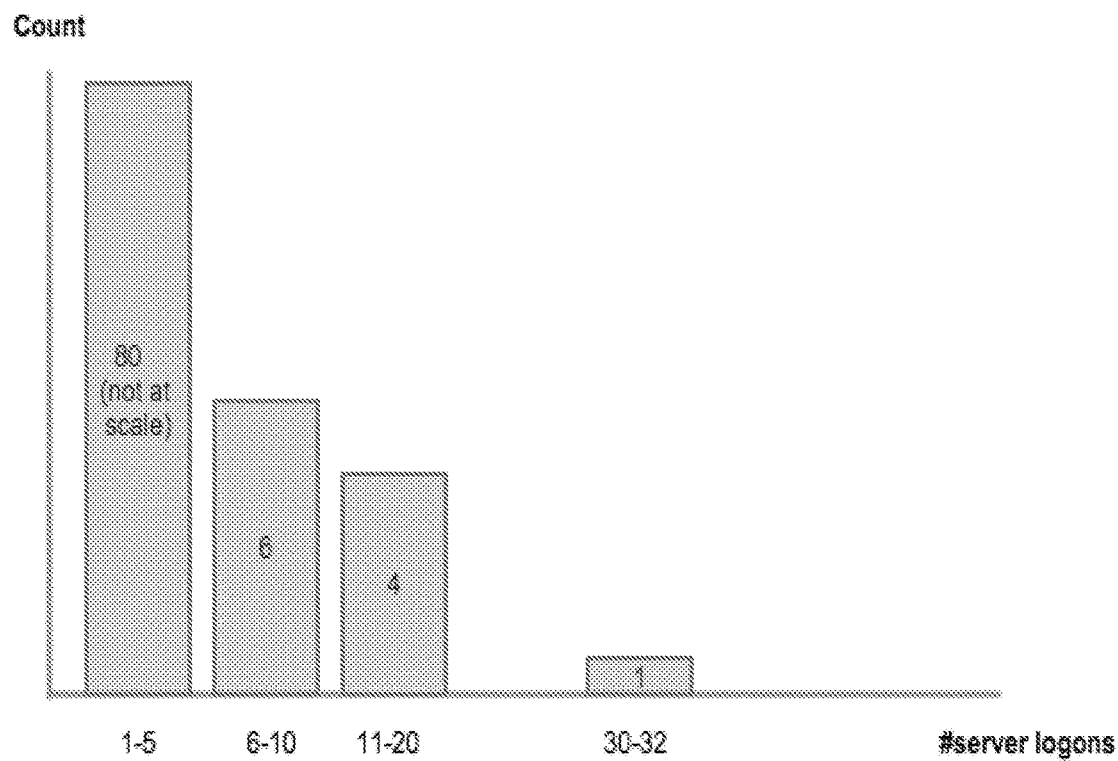
FIGS. 10a-b illustrate example histograms.

Numerical histograms may be used for categories where the values are numbers, times, days of week (e.g., the seven days are represented by the numbers 1-7), or schedule-related categories. In such cases, each bin represents a number or a number range. FIG. 10*a*, which is discussed below, is an example of a numerical histogram in which the bin values are ranges of numbers representing the number of server accesses in a single logon session.

Figure 7:
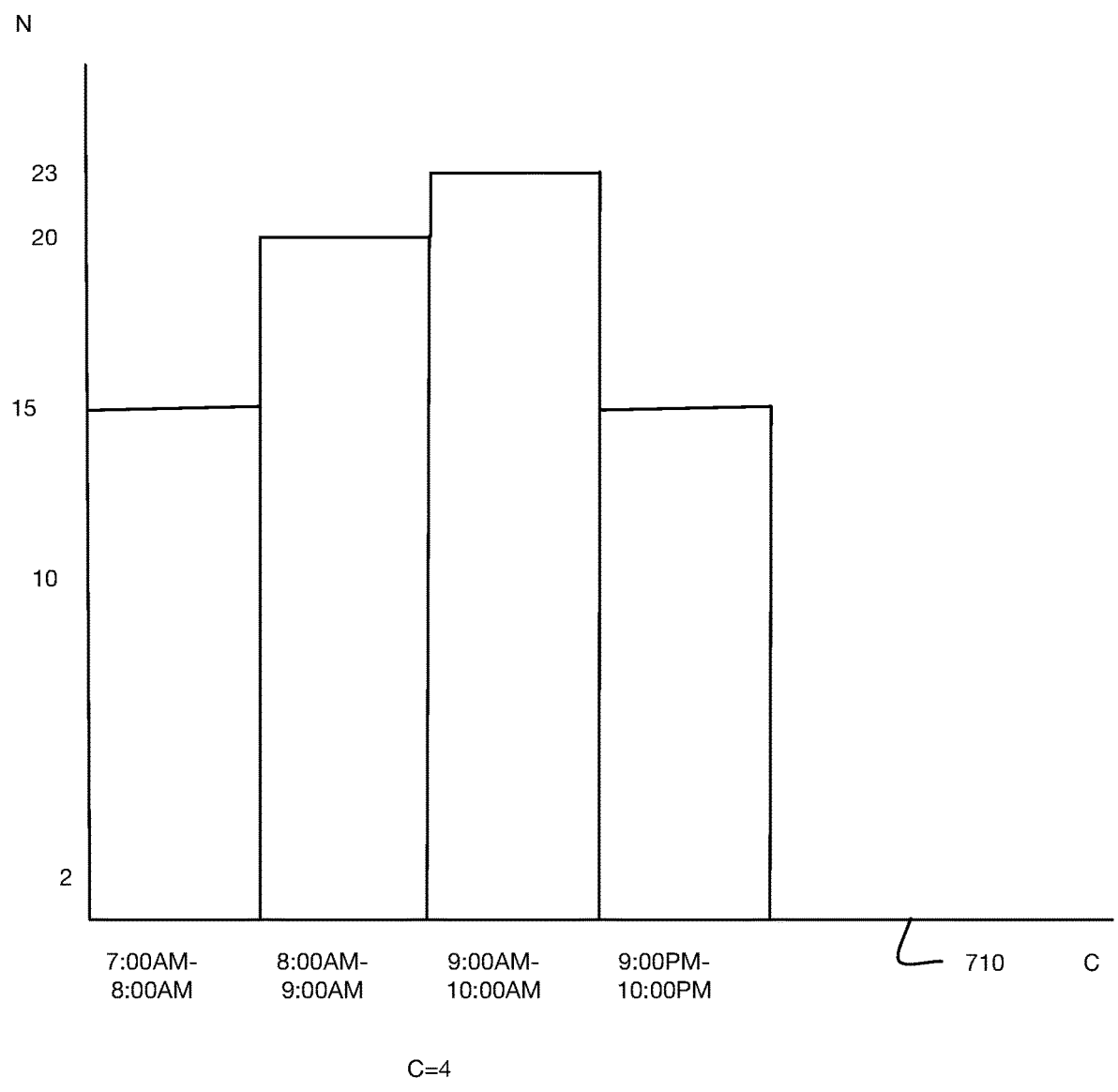
FIG. 7 illustrates an example of a numeric histogram.

FIG. 7 illustrates an example of a numerical, fixed-width histogram, wherein the category is the hour of the day in which the user logs in. The bins on the x-axis 710 each represent an hour-long time range. In the depicted histogram, the user logged in between 7:00-8:00 am fifteen times, between 8:00-9:00 am twenty times, between 9:00 am-10:00 am twenty-three times, and between 9:00 pm-10:00 pm fifteen times.

In one embodiment, the risk assessment rules executed by the rules engine (discussed below) dictate the type of behavior recorded in a histogram. The behavior models are created such that they can be used to evaluate the rules. In other words, in one embodiment, the data recorded in the behavior models correspond to variables in the rule expressions.

In order for a behavior model to truly represent a user's normal behavior, there must be sufficient data in the behavior model. In one embodiment, a behavior will only be considered in the risk assessment if there is sufficient data for the behavior to determine whether a new data point for the behavior is anomalous. In one embodiment, the system calculates a confidence score for each histogram each time data is added to the histogram, wherein only histograms having a confidence level above a threshold are used in the risk calculation score. In one embodiment, the confidence value is calculated as follows:

$$\text{Confidence factor} = \left[\frac{N-C}{N}\right]^\alpha,$$

where N=the number of observed events, and C=the number of category values received (e.g., the number of bars or bins in the histogram). The coefficient $\alpha$ affects how quickly the confidence factor converges to 1, and it can be modified to adjust the speed at which the confidence factor changes. In certain embodiments, $\alpha$ ranges from 1-3.

In the above formula, the higher the number of observed event (N) and the lower the number of category values received (C), the closer the confidence factor is to 1. Conversely, the closer the number of category values (C) is to the number of observed events (N), the closer the confidence factor is to zero. In one embodiment, certain categories must have a confidence factor of 0.7 or 0.8 before they are used for anomaly detection. The threshold confidence factor required may vary from rule to rule and may be specified in the rule expression.

Figure 8:
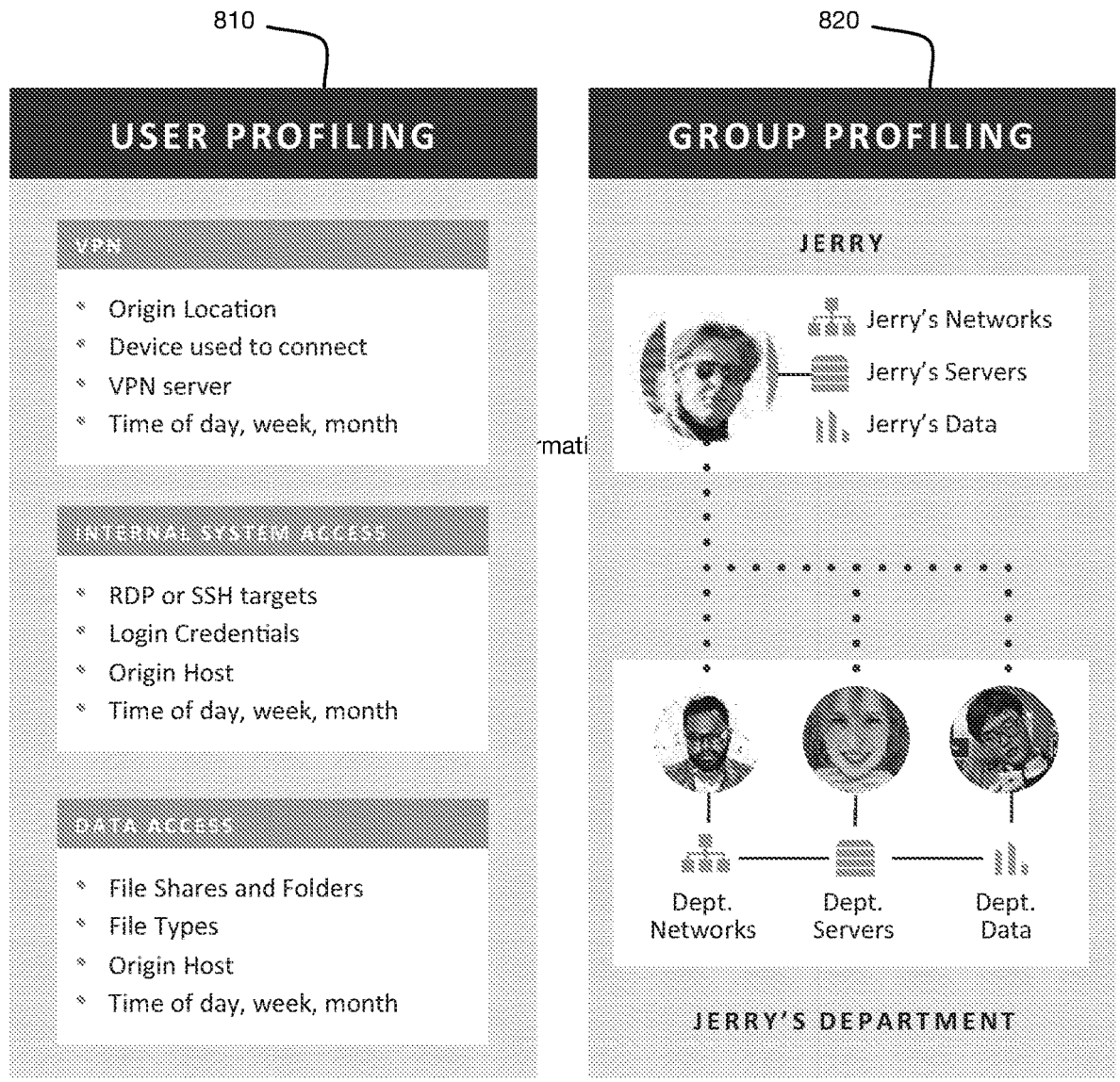
FIG. 8 illustrates examples of the type of data in user and department behavior models.

FIG. 8 illustrates examples of the type of data in user and department behavior models. In one embodiment, the data in user behavior models 810 are aggregated and used to create a group behavior model 820 for a group of users sharing at least one common characteristic (e.g., department, job, location, etc.). Behavior models may also be created for assets, such as devices.

Behavior Analysis

For each user logon session, the system compares the user's behavior in the session to the behavior model of the user or to an aggregated behavior model of people similar to the user in role, location, department, or other grouping criteria. Objects or information in the session compared to a behavior model may include client device used, location from which logon originates, servers accessed, number of servers accessed, data accessed, applications accessed, and time/duration of session. Data in the session may also be compared to an asset behavior model.

In one embodiment, the rule expressions used to calculate a risk score for a session (discussed below) define which behaviors are recorded in histograms and analyzed for anomalies. A rule expression may specify how an anomaly is to be calculated or determined. Some rule expressions may require the system to determine whether a data point is anomalous, and others may require the system to quantify how different or similar a data point is compared to a behavior model. The system is able dynamically change its behavior models and anomaly detection calculations as rules are added, deleted, or modified. The system may apply machine learning and/or statistical algorithms on the data to determine whether a data point is anomalous or to quantify how different or similar a data point is relative to other the majority of data points in a behavior model. The algorithms may use parameters specified in the rule expression. The system may perform anomaly detection on a per feature level or may use clustering algorithms to look jointly at multi-dimensional features.

Figures 9A, 9B:
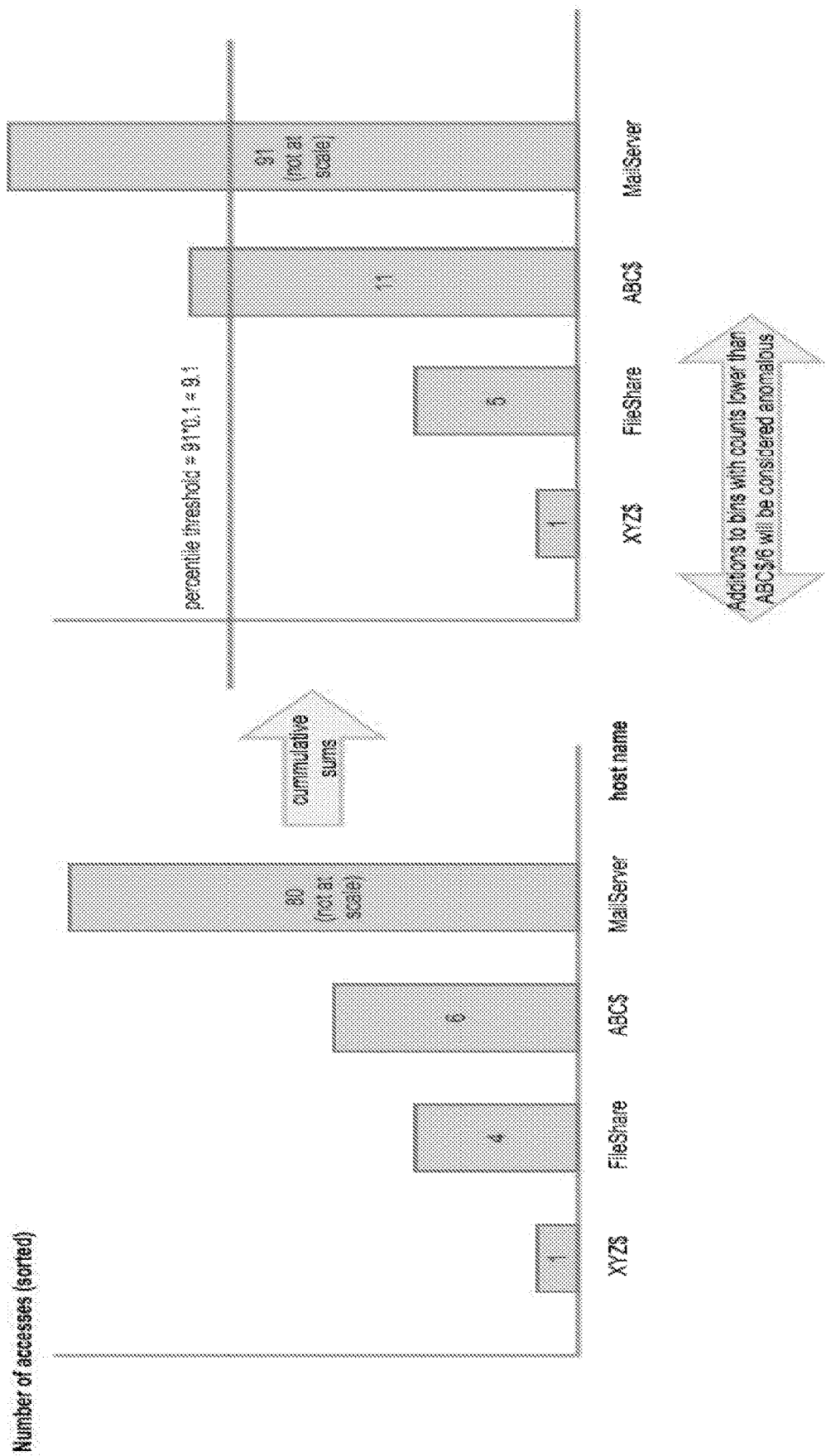
FIGS. 9*a-b* illustrate example histograms.

An example of how a system determines whether a data point is anomalous is described with respect to FIGS. 9*a* and 9*b*. FIG. 9*a* illustrates a histogram that records the servers a user has accessed and the number of times each server was accessed. To determine whether a particular server access is anomalous, the system determines the total number of servers accessed by the user. In this example, the total is 91. The system calculates an anomaly threshold by multiplying the total number of server accesses by a percentile threshold parameter, which 10% in this example. The result is 9.1. The percentile threshold parameter may be specified by the applicable rule expression and may vary from one rule to another.

The system then finds the lowest-value bin with a cumulative sum greater or equal than the anomaly threshold (9.1). FIG. 9*b* illustrates the cumulative sum for each bin in FIG. 9*a*. The cumulative sum for a bin is the bin's count plus the count of all the bins with a lower value. In this example, the first bin with a cumulative sum greater than or equal to the anomaly threshold (9.1) is the bin for the ABC$ server, which has a cumulative sum of 11. The value (not the cumulative sum) of this bin serves as the dividing line from what is considered normal and what is considered an anomaly. In this example, this means that a data point with a value less than 6 (the value of the ABC$ bin in FIG. 9*a*) is considered anomalous.

Figure 10B:
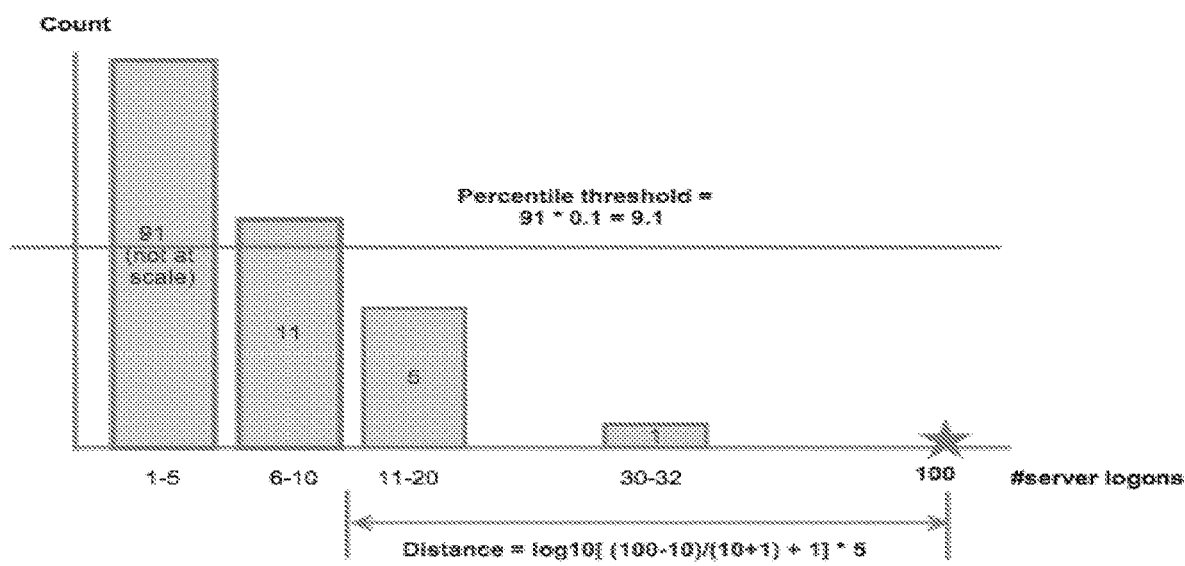

An example of how a system quantifies how different a data value is described with respect to FIGS. 10*a*-10*b*. In this example, the distance between a data point and a threshold data point in the model is calculated. FIG. 10*a* illustrates a histogram that records the number of server logons for a user in a single logon session. The system calculates the total number of logons in the model (i.e., the cumulative sum of all the bin values). In this example, the total is 91. The system calculates an anomaly threshold by multiplying the total number of server accesses by a percentile threshold parameter, which 10% in this example. The result is 9.1. As discussed above, the percentile threshold parameter may be specified by the applicable rule expression and may vary from one rule to another.

The system then finds the lowest-value bin with a cumulative sum greater or equal than the anomaly threshold (9.1). FIG. 10*b* illustrates the cumulative sum for each bin in FIG. 10*a*. In this example, the first bin with a cumulative sum greater than or equal to the anomaly threshold (9.1) is the "6-10" bin, which has a cumulative sum of 11. The distance between the data point and this closest edge of the bin (i.e., 10) is the measure of how different/similar the data point is relative to the data in the model. In this example, the distance is calculated as the normalized log value of the distance between the data point (100) to the closest edge of the bin (10). In this example, the calculation is log 10 [(100-10)/10+1)+1] *5. Although log value is used in this example, the normal distance may be used in other models, such as a Day of the Week histogram where the x values range from 1-7 (one number for each day of the week).

Calculating a Risk Score

Figure 11A:
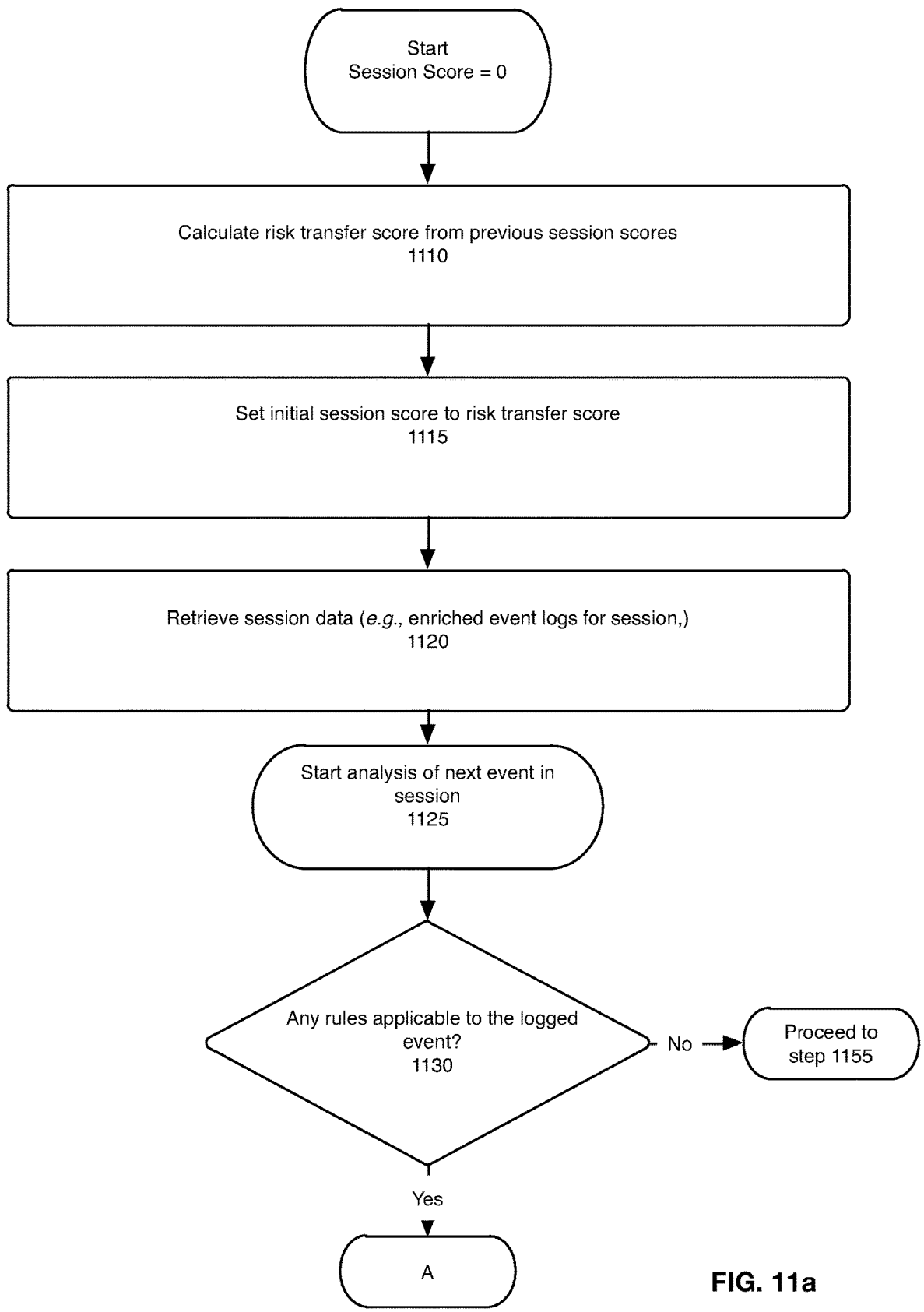
FIGS. 11a and 11b are flowcharts that illustrate an example of calculating a risk score.
Figure 11B:
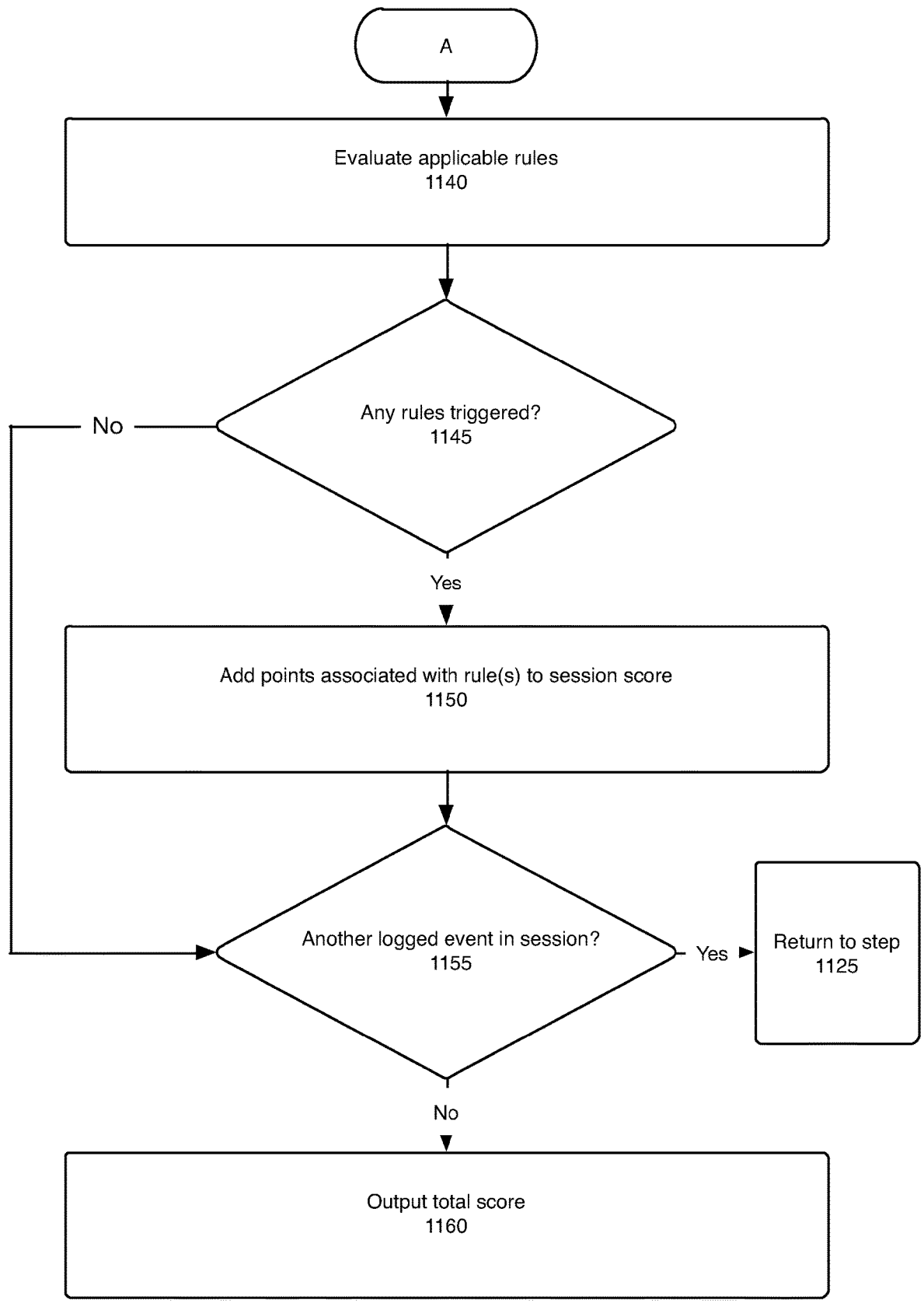

The system calculates a risk score for each user logon session based at least in part on the comparison between the user's session behavior and the user' behavior model, wherein select abnormalities between session behavior and the behavior model are associated with a higher risk score. The risk score may be calculated once the session is complete (i.e., user logs out or has a certain period of inactivity), or, while the session is open, the system may calculate a running risk score in substantially real time, wherein the score is updated as applicable user events for the session come into the system FIG. 11 illustrates an example of calculating a risk score using rules that map certain behaviors to risk points. When a session begins, the system calculates a risk transfer score from previous session scores (step 1110). The purpose behind the risk transfer score is to ensure that users who recently have had one or more recent sessions with high-risk scores do not start the session with a non-zero score. An example of how to calculate the risk transfer score is described below with respect to FIG. 13. The system sets the initial session score to the risk transfer score (step 1115), and retrieves session data (e.g., the enriched event logs, values for variables in the rule expressions) (step 1120). In some cases, the system may also retrieve risk intelligence information from third party data sources. The system then analyzes the first event in the system and determines if there are any rules applicable to the logged event (steps 1125, 1130). If not, the system proceeds to the next event in the logon session. If there are rules applicable to the event, the system evaluates the applicable rules and determines if any of them are triggered (i.e., the expressions evaluate to true) (steps 1140, 1145). If so, the system adds points associated with the triggered rule(s) to the session score (step 1150). If there are additional events in the session, the system returns to step 1125 (step 1155). Otherwise, the system outputs a total score (step 1160). The total score may be adjusted based on third-party intelligence information.

FIG. 12 is a table of example rules. Column 1210 provides a summary of the criteria that would trigger the rule, column 1220 lists the points added to a risk score if a rule is triggered, column 1230 illustrates the confidence threshold the applicable data for the rule must have in order for the rule to trigger, and column 1240 lists list the events that cause the rule to be evaluated. Table 12 does not list actual rule expressions, but provides a summary of the rules for simplicity. The rules in table 12 are all associated with positive risk score points, but there may be rules that have negative points (i.e., rules that, if triggered, would lower the risk score). Not all the risk rules necessarily relate to anomaly detection. Some rules may trigger based on third party intelligence information (e.g., if the source IP address is a known risk threat), the sensitivity of the data or resource accessed, or the access level/role of the user. For example, a risk rule may specify that points be added to a risk score simply because the data accessed is designated as sensitive or because of the user has a high position in the enterprise (e.g., a CEO or vice-president).

Figure 13:
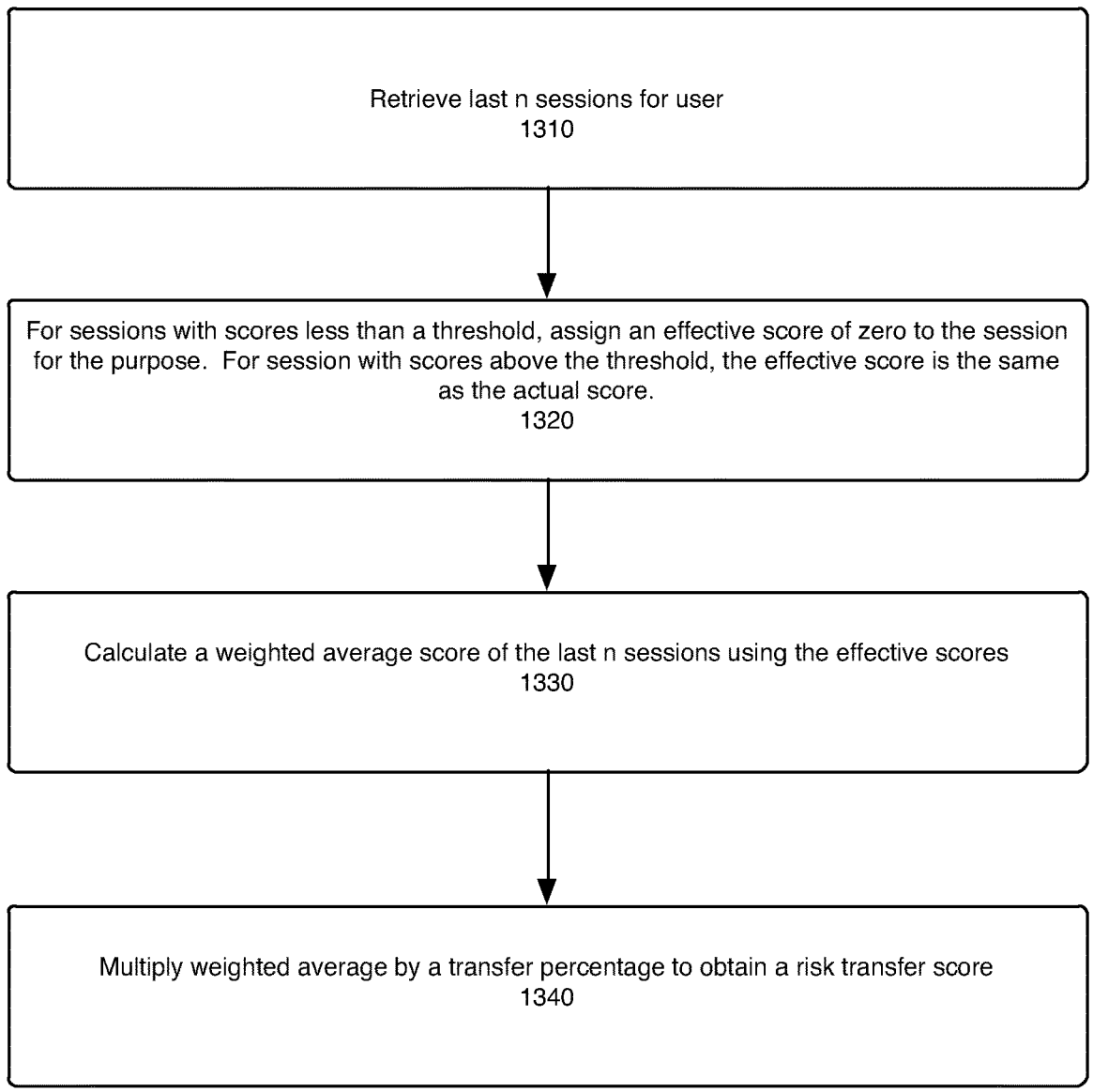
FIG. 13 is a flowchart that illustrates an example of a method for calculating a risk transfer score.

FIG. 13 illustrates an example of a method for calculating a risk transfer score. The system retrieves the risk scores for the last n sessions (e.g., the last seven sessions) (step 1310) and, for each of the n sessions, assigns an effective risk score to the session based on whether the actual score for the session (excluding the risk transfer score for the session) is below or above a threshold (step 1320). Specifically, for sessions with actual risk scores less than a threshold, the system assigns an effective risk score of zero to the session for the purpose of calculating the risk transfer score. For sessions with risk scores above the threshold, the effective risk score is equated to the actual risk score. The system then calculates a weighted average score of the last n sessions using the effective scores, and multiples the weighted average by a transfer percentage to obtain a risk transfer score (steps 1330 and 1340). In one embodiment, the most recent sessions are assigned a higher weight than earlier sessions, with the last session having a significantly higher weight than the previous ones (e.g., two to three times higher than the next highest weight). If the transfer percentage is set to less than 100%, only a portion of the weighed average is assigned to the current session score.

An example of a risk score calculation is described below with respect to the session data illustrated in Table 1.

TABLE 1

| Session Start-End | Score | Effective Score Transfer after 40 Threshold | Session Weight |
|---|---|---|---|
| Oct 11$^{th}$ 9am-5pm | 10 | 0 | 5 |
| Oct 12$^{th}$ 9am-5pm | 10 | 0 | 10 |
| Oct 12$^{th}$ 7pm-9pm | 90 | 90 | 15 |
| Oct 13$^{th}$ 2am-7am | 15 | 0 | 20 |
| Oct 13$^{th}$ 9am-5pm | 0 | 0 | 25 |
| Oct 14$^{th}$ 9am-5pm | 20 | 0 | 30 |
| Oct 15$^{th}$ | 85 | 85 | 90 |

Table 1 illustrates a user's past seven sessions, corresponding actual risk scores for each of the sessions (after subtracting the risk transfer score for the session), corresponding effective scores, and the weight applied to each of the sessions. In this example, any session with an actual score below 40 points is assigned an effective score of zero for the purpose of calculating the risk transfer score. If the risk transfer percentage is set to seventy percent, then the risk transfer score for the above session data using the method of FIG. 13 would be:

Risk Transfer Score=(0×5)+(0×10)+(90×15)+(0×20)+(0×30)+(85×90)/195*0.70=32

Figure 14:
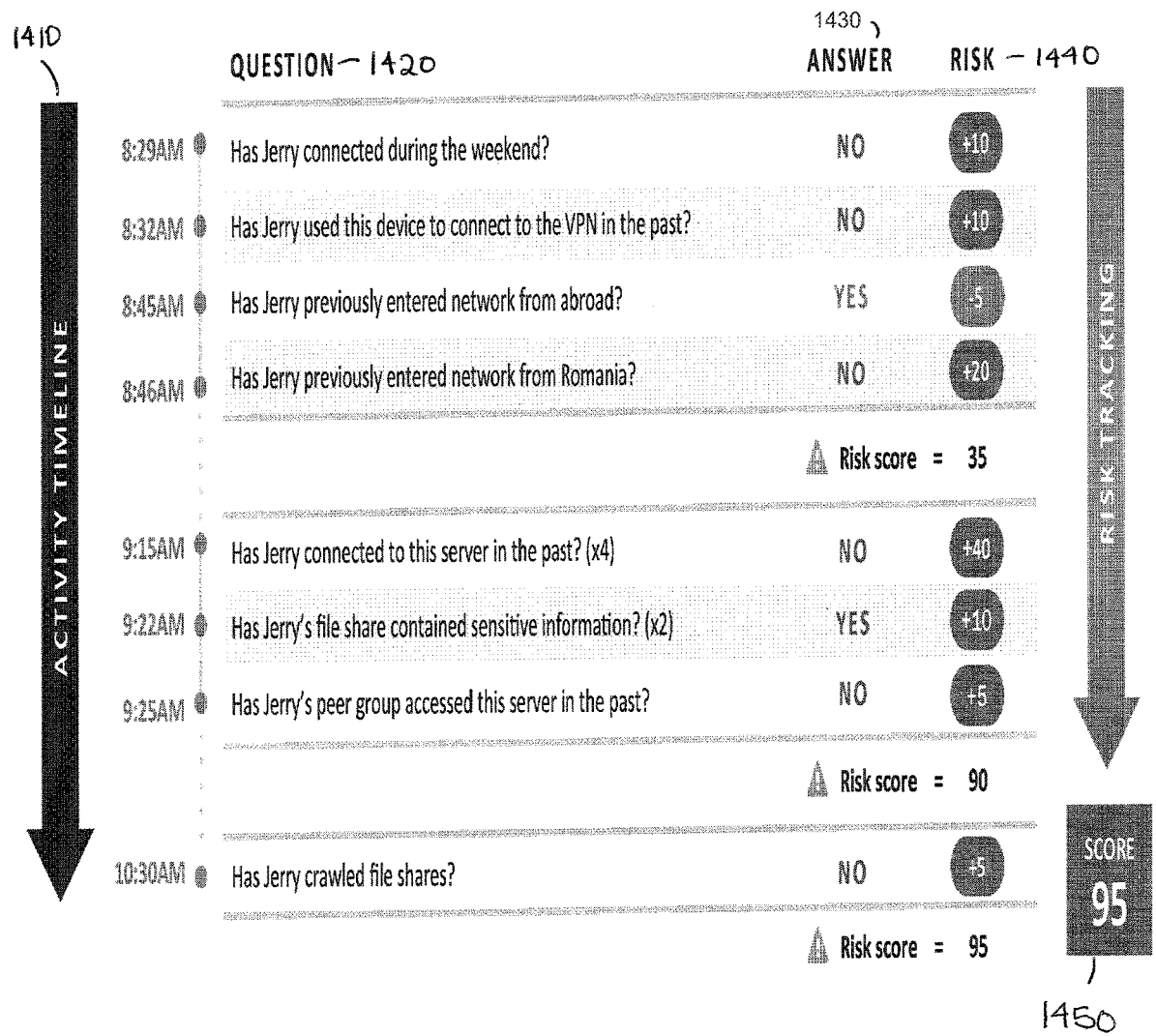
FIG. 14 illustrates a conceptual example of the type of behavior comparisons made in a behavior analysis.

FIG. 14 illustrates a simplified conceptual example of the type of comparisons made by the system. In this example, a user, "Jerry," has connected to his enterprises' network over the weekend from Romania using a VPN. In this case, the rules executed by the system in calculating the risk assessment score, effectively ask the questions 1420 illustrated in FIG. 14 and assign a corresponding risk subtotal score 1440 depending on the answer 1430. The timeline 1410 illustrates that the system is tracking the user's state throughout a logon session and the total risk score 1450 is adjusted as applicable events occur.

Figure 15:
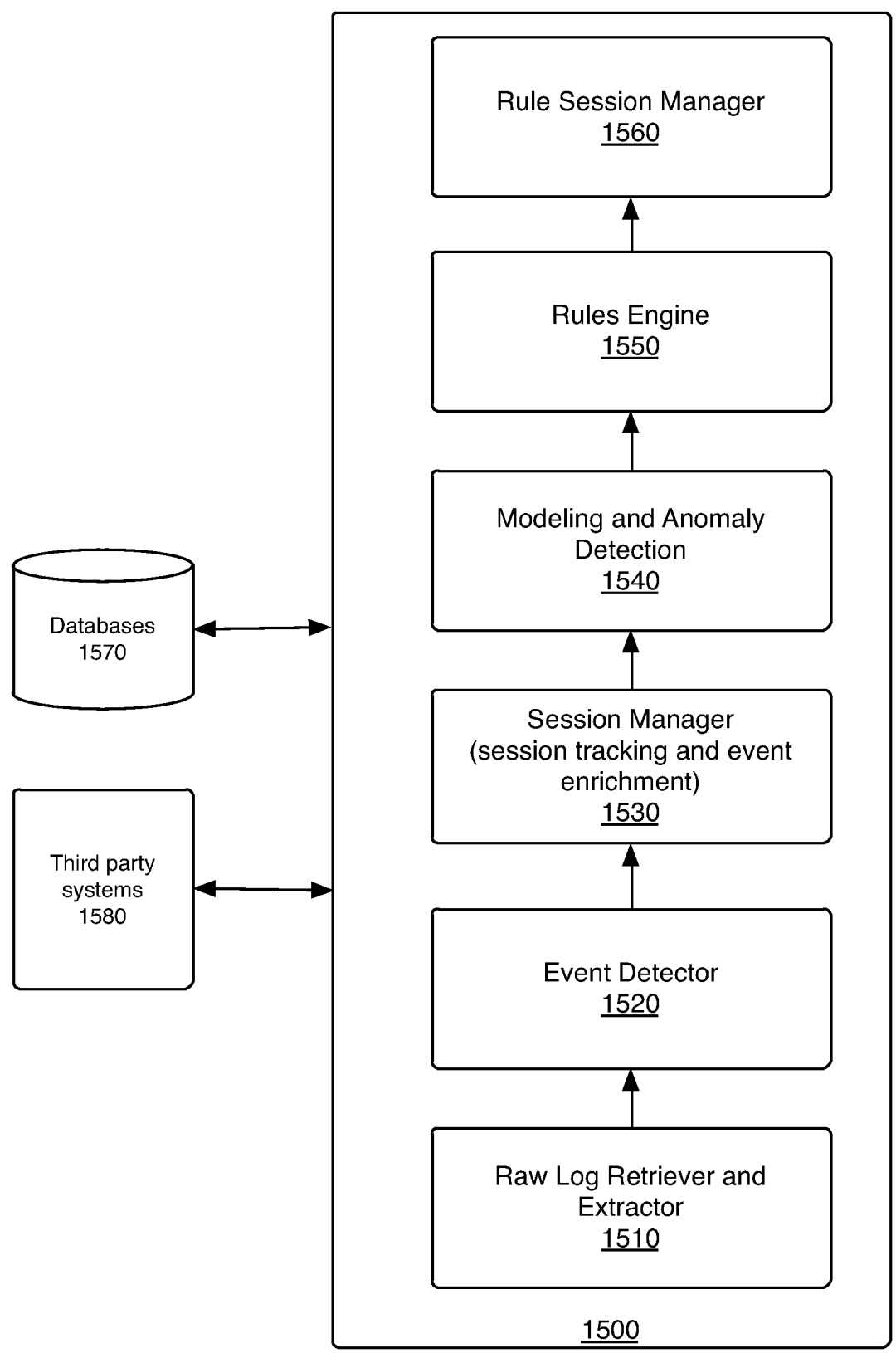
FIG. 15 illustrates an example architecture for a system for detecting and assessing security risks.

Example Architecture FIG. 15 illustrates an example architecture for a system that performs the methods described herein. A person skilled in the art would understand that a system for performing such methods may be constructed in other ways. The methods described herein may be implemented in other systems and are not limited to system 1500.

The system includes a Raw Log Retriever module 1510, an Event Detector module 1520, a Session Manager module 1530, a Modeling and Anomaly Detection module 1540, a Rules Engine 1550, and a Rule Session Manager module 1560. Modules 1510-1560 are software modules that are executed on one or more computer systems. The system 1510 stores event logs, rules, behavior models, and session scores in one or more databases 1570 and may also access one or more third party systems 1580 for raw data logs, context data, or threat intelligence.

Figure 16A:
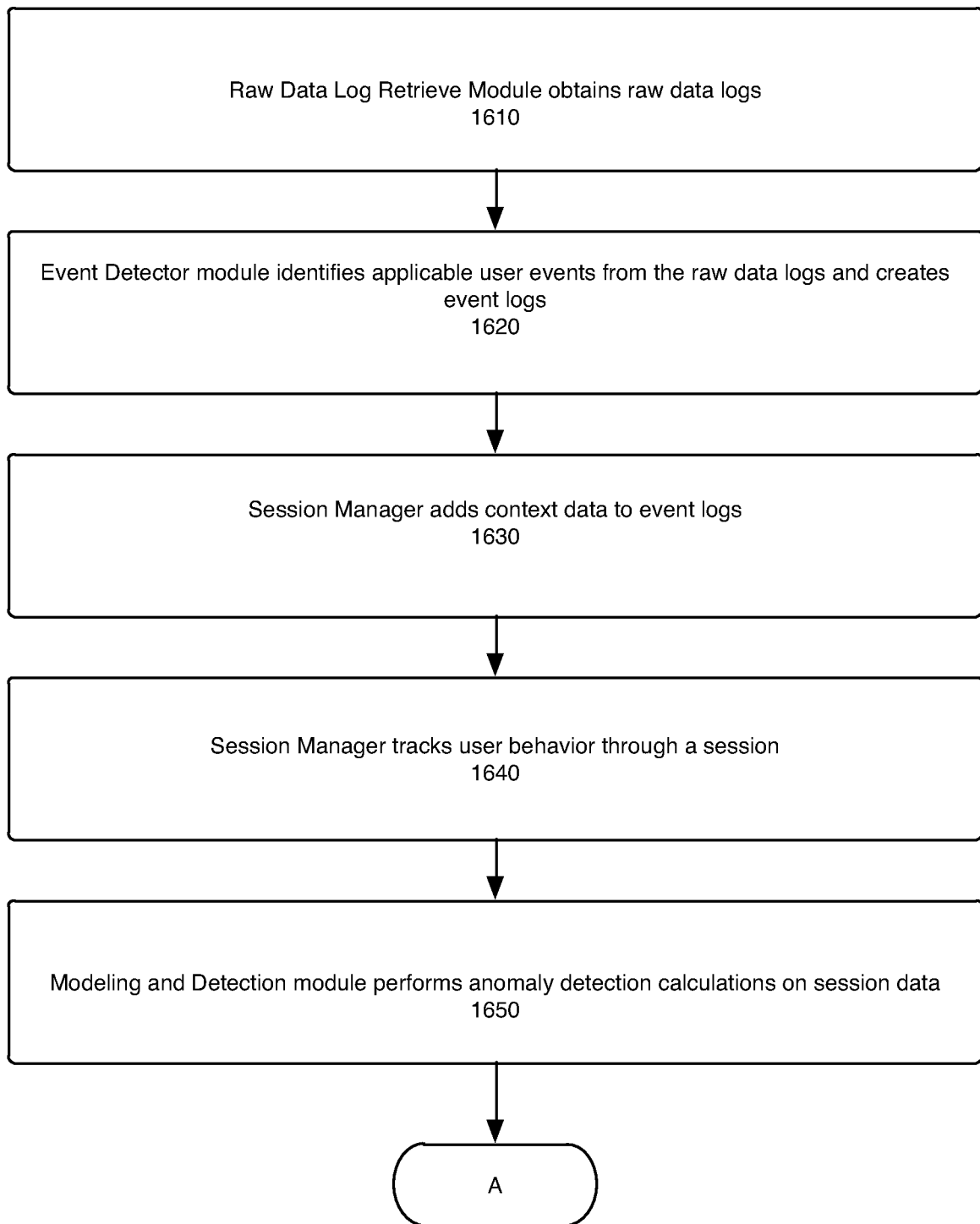
FIGS. 16a and 16b are flowcharts that illustrate a method that illustrates the functions performed by software modules in the system.
Figure 16B:
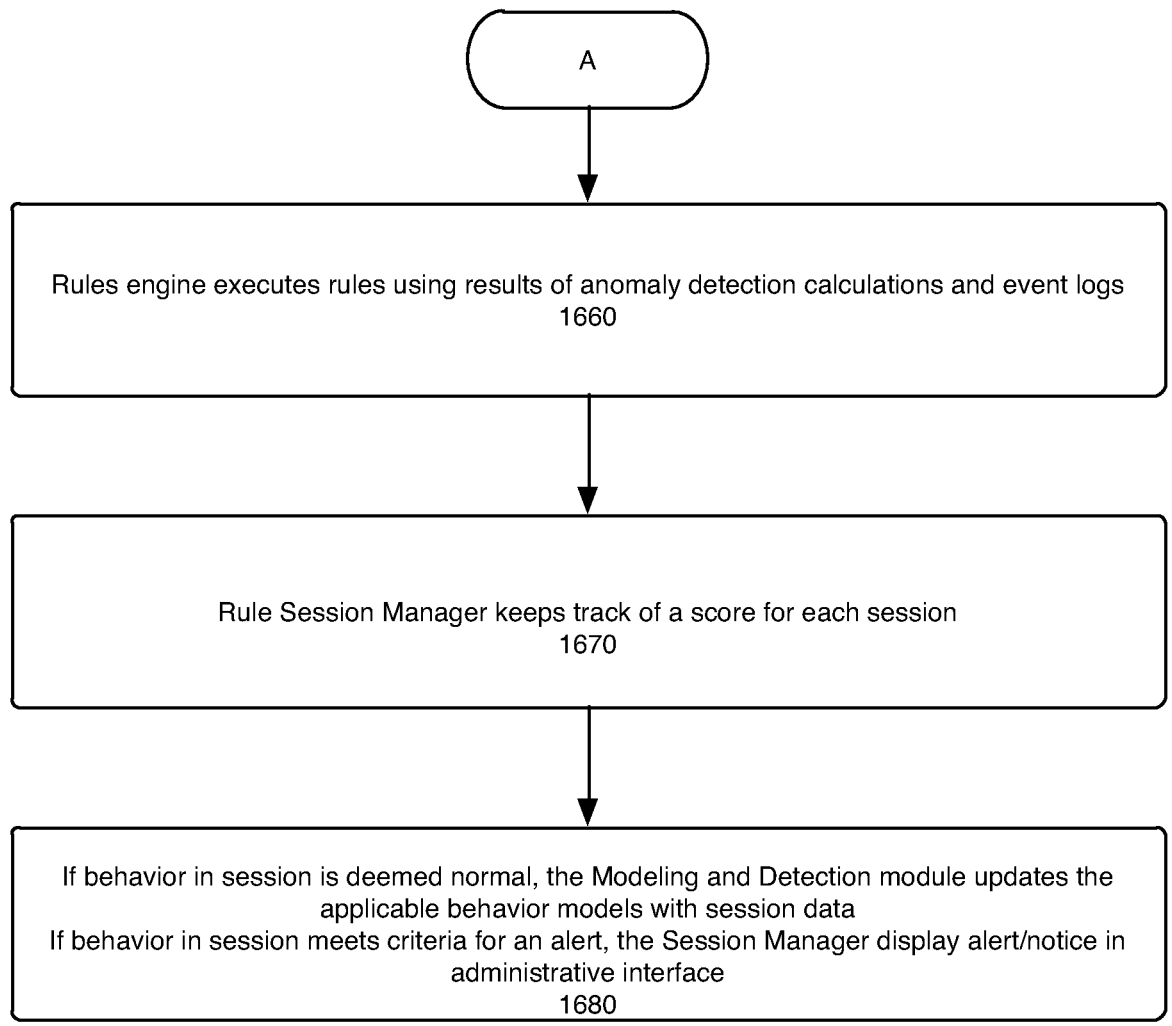

FIG. 16 is a flowchart that illustrates the functions performed by the various modules in system 1500. The Raw Data Log Retrieve module 1510 obtains raw data logs related to a user's interactions with the IT infrastructure, such as user logon events, server access events, application access events, and data access events (step 1610). The raw data logs may be obtained from third party systems, such as SPLUNK, ARCSIGHT/HP, LOGLOGIC, HADOOP, SUMO LOGIC, LOGGLY, etc.

The Event Detector 1520 identifies applicable user events from the raw data logs and creates event logs (step 1620). The event logs are provided to the Session Manager 1530, which then supplements the event logs with additional data that provide further context for user events, as discussed above (step 1630). The Session Manager 1530 may obtain context information from local, on-site data sources (e.g., Active Directory), and may also obtain data from external data sources via the Internet or other network.

The Session Manager 1530 also tracks user behavior through a session (e.g., logon session) by grouping the enriched event logs by user and session (step 1640). Throughout a session, the Session Manager 1530 records the current state of a user in a session database. The Session Manager 1530 maintains the session and asset databases discussed above.

The Modeling and Detection module 1540 uses the session information to perform anomaly calculations needed by the Rules Engine (step 1650). In one embodiment, the Modeling and Detection module 1540 parses the rule expressions to determine the anomaly and confidence data required by the rule expressions. It performs the anomaly calculations (i.e., the values for the rule expressions), such as whether a data point is anomalous or the distance calculation between a data point and other data in a model. For each anomaly calculation, it also calculates a confidence factor for the behavior model data used in the anomaly calculations. In an alternate embodiment, the anomaly calculations are performed by the Rules Engine 1550.

The Modeling and Detection Module 1540 makes the anomaly and confidence factor calculation results available to the Rules Engine 1550 either by passing the results directly to the engine or storing them in a database accessible to the engine. The Rules Engine 1550 executes the risk score rules and determines which rules are triggered (step 1660). The Rule Session Manager 1560 keeps track of a risk score for each logon session (step 1670). If the risk score and session meet certain criteria, the Rule Session Manager 1560 displays an alert/notice regarding the session in the user interface (step 1680). In one embodiment, an alert is displayed if a session meets one of the following criteria:
 1. The session is a current session (i.e. it's on-going), and the risk score exceeds a threshold (e.g., a score of 90) for a duration longer than a specified period of time (e.g., 1 hour); OR
 2. The session has ended, and the final risk score for the session is above a threshold (e.g., 90)

The Session Manager 1560 may rank alerts displayed in the administrative interface based on risk scores.

If the risk score is below a threshold or otherwise considered normal, the Modeling and Anomaly Detection Module 1530 updates applicable user and group behavior models with the session data (step 1680).

In one embodiment, the Modeling and Anomaly Detection module 1540 parses the rules in the rules database to identify the type of data (e.g., the type of histograms) needed in the behavior model. As rules change, the Modeling and Anomaly Detection module 1540 updates the behavior models so that data for the rule expressions can be calculated. Also, the Session Manager 1530 may parse the rules to identify the context data to add to the event logs and determine where to retrieve such data (i.e., from local or external sources).

Figure 17:
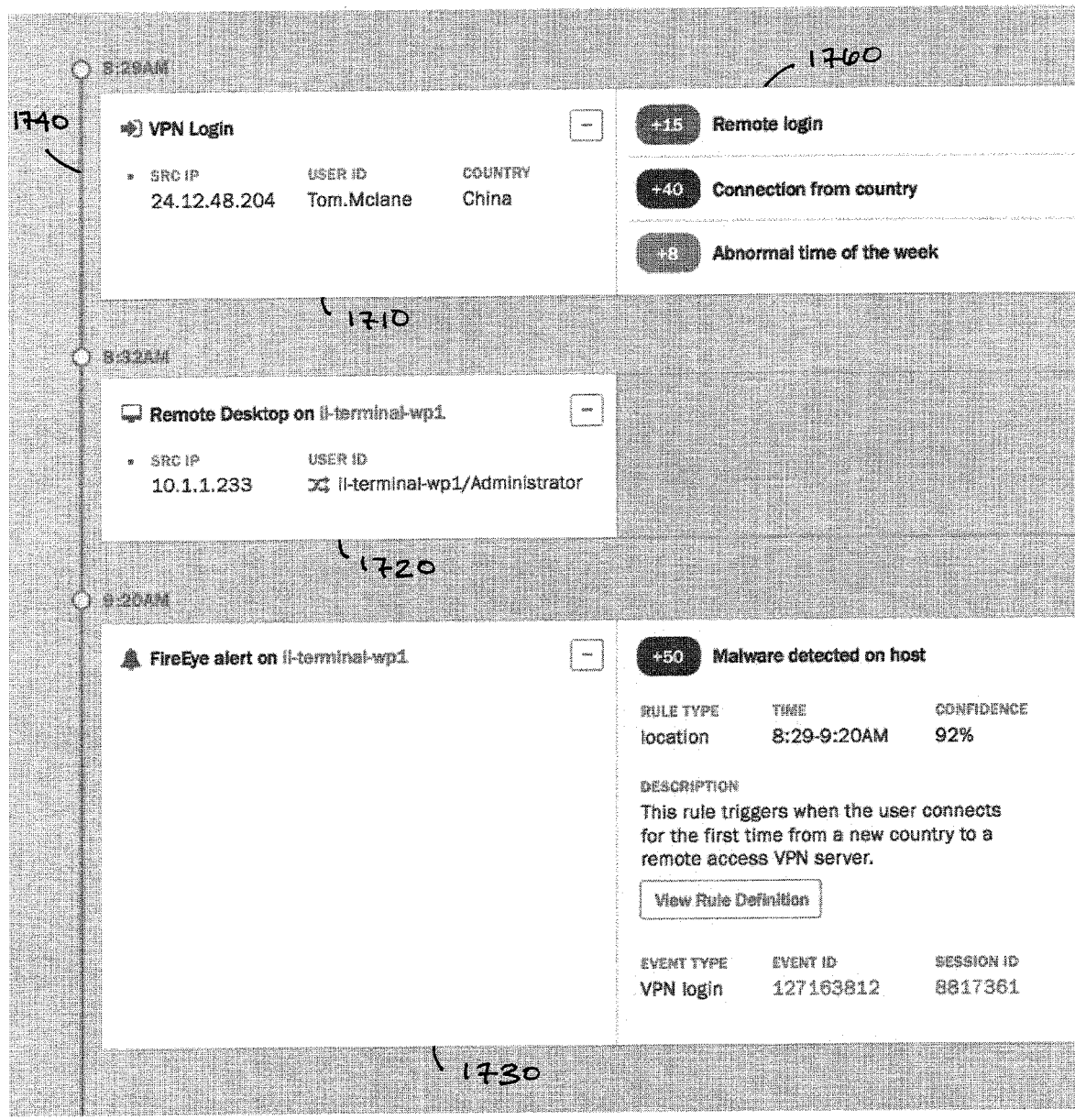
FIG. 17 is a screenshot that illustrates an example administrative interface.

FIG. 17 illustrates an example of a user interface for the system, which would typically be viewed by an administrator, IT personnel, or other enterprise personnel responsible for monitoring security risks to the enterprise. For a session meeting certain criteria for an alert (e.g., the risk score exceeds a threshold), the user interface illustrates the events (e.g., 1710, 1720, 1730) in the session and a summary 1760 of the rules triggered by the events. The user interface includes a timeline 1740 that illustrates when applicable user events occurred.

The methods described herein are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the claims.

The invention claimed is:

1. A method, performed by one or more computer devices, for detecting and assessing security risks in an enterprise's computer network, the method comprising:
  building a behavior model for a user based on the user's interactions with the network, wherein the behavior model for the user indicates client device(s), server(s), application(s), and data used by the user;
  building a group behavior model based on aggregated data of the interactions with the network of a plurality of users that share a common characteristic with the user, wherein the behavior model for the group indicates client device(s), server(s), application(s), and data used by the plurality of users that share a common characteristic with the user;
  comparing a plurality of user events in the network to the user's behavior model and the group's behavior model;
  determining, based at least in part on a comparison between the user events and the user's behavior model and the group's behavior model, whether the user events satisfy one or more of a plurality of rules that define types of anomalies that increase a risk assessment, wherein each rule is associated with points for a risk assessment score;
  calculating the risk assessment score for the plurality of user events; and
  determining whether the plurality of user events satisfies criteria for an alert, wherein the criteria includes a risk assessment score that exceeds a threshold, wherein:
   in response to the plurality of user events satisfying the criteria for an alert, displaying an alert in an administrative interface, and
   in response to the plurality of user events not satisfying the criteria for an alert, updating the user's behavior model and the group's behavior model with data related to the plurality of user events.

2. The method of claim 1, wherein the plurality of user events is during a user logon session, wherein a user logon session begins at the user's logon to the network and ends at the user's subsequent logout of the network or a specified period of inactivity by the user.

3. The method of claim 2, wherein the user events are identified from raw data logs, wherein enhanced events logs are created from the raw data logs by adding additional context information related to the user events, wherein the enhanced event logs are grouped by user logon session to track user actions during a user logon session, and wherein the enhanced event logs are used to build user behavior models and group behavior models.

4. The method of claim 3, wherein the additional context information comprises one or more of the following: additional user information, additional client device information, additional server information, and additional information about accessed data.

5. The method of claim 2, wherein an alert is displayed if the user logon session meets at least one of the following criteria: (i) the user logon session is a current session and the risk assessment score exceeds a threshold for a specified duration and (ii) the user logon session has ended and the final risk assessment score is above a threshold.

6. The method of claim 1, wherein the user's behavior model and the group's behavior model include the user's time logon patterns and comparing the plurality of user events to the user's behavior model and the group's behavior model also includes determining whether the user events are occurring or occurred at a time consistent with the time patterns in the user's behavior model and the group's behavior model.

7. The method of claim 1, wherein the user's behavior model and the group's behavior model include the user's geo-location logon patterns and comparing the plurality of user events to the user's behavior model and the group's behavior model also includes determining whether a geo-location from which the user logged in is consistent with the geo-location patterns in the user's behavior model and the group's behavior model.

8. The method of claim 1, wherein calculating the risk assessment score comprises associating a sub-total risk score with each of certain anomalies in the user events and aggregating all sub-total risk scores to calculate the risk assessment score for the plurality of user events.

9. The method of claim 8, wherein the system stores rules that define types of anomalies associated with a positive risk score.

10. The method of claim 9, wherein the system also stores one or more rules that define types of behavior associated with a negative risk score.

11. The method of claim 1, wherein one or more of the following are factored into the risk assessment: the user's access authorization level in the system, a value of the data accessed, and threat intelligence.

12. A non-transitory computer-readable medium comprising a computer program that, when executed by a computer system, enables the computer system to perform the following method for detecting and assessing security risks in an enterprise's computer network, the method comprising:
    building a behavior model for a user based on the user's interactions with the network, wherein the behavior model for the user indicates client device(s), server(s), application(s), and data used by the user;
    building a group behavior model based on aggregated data of the interactions with the network of a plurality of users that share a common characteristic with the user, wherein the behavior model for the group indicates client device(s), server(s), application(s), and data used by the plurality of users that share a common characteristic with the user;
    comparing a plurality of user events in the network to the user's behavior model and the group's behavior model;
    determining, based at least in part on a comparison between the user events and the user's behavior model and the group's behavior model, whether the user events satisfy one or more of a plurality of rules that define types of anomalies that increase a risk assessment, wherein each rule is associated with points for a risk assessment score;
    calculating the risk assessment score for the plurality of user events; and
    determining whether the plurality of user events satisfies criteria for an alert, wherein the criteria includes a risk assessment score that exceeds a threshold, wherein:
        in response to the plurality of user events satisfying the criteria for an alert, displaying an alert in an administrative interface, and
        in response to the plurality of user events not satisfying the criteria for an alert, updating the user's behavior model and the group's behavior model with data related to the plurality of user events.

13. The non-transitory computer-readable medium of claim 12, wherein the plurality of user events is during a user logon session, wherein a user logon session begins at the user's logon to the network and ends at the user's subsequent logout of the network or a specified period of inactivity by the user.

14. The non-transitory computer-readable medium of claim 13, wherein the user events are identified from raw data logs, wherein enhanced events logs are created from the raw data logs by adding additional context information related to the user events, wherein the enhanced event logs are grouped by user logon session to track user actions during a user logon session, and wherein the enhanced event logs are used to build user behavior models and group behavior models.

15. The non-transitory computer-readable medium of claim 14, wherein the additional context information comprises one or more of the following: additional user information, additional client device information, additional server information, and additional information about accessed data.

16. The non-transitory computer-readable medium of claim 13, wherein an alert is displayed if the user logon session meets at least one of the following criteria: (i) the user logon session is a current session and the risk assessment score exceeds a threshold for a specified duration and (ii) the user logon session has ended and the final risk assessment score is above a threshold.

17. The non-transitory computer-readable medium of claim 12, wherein the user's behavior model and the group's behavior model include the user's time logon patterns and comparing the plurality of user events to the user's behavior model and the group's behavior model also includes determining whether the user events are occurring or occurred at a time consistent with the time patterns in the user's behavior model and the group's behavior model.

18. The non-transitory computer-readable medium of claim 12, wherein the user's behavior model and the group's behavior model include the user's geo-location logon patterns and comparing the plurality of user events to the user's behavior model and the group's behavior model also includes determining whether a geo-location from which the user logged in is consistent with the geo-location patterns in the user's behavior model and the group's behavior model.

19. The non-transitory computer-readable medium of claim 12, wherein calculating the risk assessment score comprises associating a sub-total risk score with each of certain anomalies in the user events and aggregating all sub-total risk scores to calculate the risk assessment score for the plurality of user events.

20. The non-transitory computer-readable medium of claim 19, wherein the system stores rules that define types of anomalies associated with a positive risk score.

21. The non-transitory computer-readable medium of claim 20, wherein the system also stores one or more rules that define types of behavior associated with a negative risk score.

22. The non-transitory computer-readable medium of claim 12, wherein one or more of the following are factored into the risk assessment: the user's access authorization level in the system, a value of the data accessed, and threat intelligence.

23. A computer system for detecting and assessing security risks in an enterprise's computer network, the system comprising:
one or more processors;
one or more physical, computer-readable storage media coupled to the one or more processors, wherein the one or more physical, computer-readable storage media store instructions that, when executed by the one or more processors, cause the system to perform the operations of:
building a behavior model for a user based on the user's interactions with the network, wherein the behavior model for the user indicates client device(s), server(s), application(s), and data used by the user;
building a group behavior model based on aggregated data of the interactions with the network of a plurality of users that share a common characteristic with the user, wherein the behavior model for the group indicates client device(s), server(s), application(s), and data used by the plurality of users that share a common characteristic with the user;
comparing a plurality of user events in the network to the user's behavior model and the group's behavior model;
determining, based at least in part on a comparison between the user events and the user's behavior model and the group's behavior model, whether the user events satisfy one or more of a plurality of rules that define types of anomalies that increase a risk assessment, wherein each rule is associated with points for a risk assessment score;
calculating the risk assessment score for the plurality of user events; and
determining whether the plurality of user events satisfies criteria for an alert, wherein the criteria includes a risk assessment score that exceeds a threshold, wherein:
in response to the plurality of user events satisfying the criteria for an alert, displaying an alert in an administrative interface, and
in response to the plurality of user events not satisfying the criteria for an alert, updating the user's behavior model and the group's behavior model with data related to the plurality of user events.

24. The computer system of claim 23, wherein the plurality of user events is during a user logon session, wherein a user logon session begins at the user's logon to the network and ends at the user's subsequent logout of the network or a specified period of inactivity by the user.

25. The computer system of claim 24, wherein an alert is displayed if the user logon session meets at least one of the following criteria: (i) the user logon session is a current session and the risk assessment score exceeds a threshold for a specified duration and (ii) the user logon session has ended and the final risk assessment score is above a threshold.

* * * * *